(12) United States Patent
Sakaue et al.

(10) Patent No.: US 12,088,765 B2
(45) Date of Patent: Sep. 10, 2024

(54) CASING STRUCTURE, OPTICAL SCANNER, AND IMAGE FORMING APPARATUS

(71) Applicants: Yoshinobu Sakaue, Kanagawa (JP); Takeshi Yamakawa, Kanagawa (JP); Susumu Narita, Tokyo (JP); Ryo Sato, Tokyo (JP); Makoto Noda, Tokyo (JP)

(72) Inventors: Yoshinobu Sakaue, Kanagawa (JP); Takeshi Yamakawa, Kanagawa (JP); Susumu Narita, Tokyo (JP); Ryo Sato, Tokyo (JP); Makoto Noda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/120,487

(22) Filed: Mar. 13, 2023

(65) Prior Publication Data
US 2023/0308566 A1 Sep. 28, 2023

(30) Foreign Application Priority Data

Mar. 22, 2022 (JP) ................................. 2022-045753
Oct. 28, 2022 (JP) ................................. 2022-173554

(51) Int. Cl.
*H04N 1/00* (2006.01)
*H04N 1/10* (2006.01)

(52) U.S. Cl.
CPC ..... *H04N 1/00551* (2013.01); *H04N 1/00559* (2013.01); *H04N 1/10* (2013.01)

(58) Field of Classification Search
None
See application file for complete search history.

(56) References Cited

U.S. PATENT DOCUMENTS

| 6,072,516 | A | 6/2000 | Yamakawa |
| 6,236,418 | B1 | 5/2001 | Yamakawa |
| 6,243,128 | B1 | 6/2001 | Yamakawa |
| 2003/0160860 | A1 | 8/2003 | Yamakawa |
| 2004/0105079 | A1 | 6/2004 | Yamakawa et al. |
| 2004/0240083 | A1 | 12/2004 | Yamakawa et al. |
| 2005/0012974 | A1 | 1/2005 | Ono et al. |

(Continued)

FOREIGN PATENT DOCUMENTS

| JP | 2004-262118 | 9/2004 |
| JP | 2006-039413 | 2/2006 |

(Continued)

*Primary Examiner* — Darryl V Dottin
(74) *Attorney, Agent, or Firm* — XSENSUS LLP

(57) ABSTRACT

A casing structure, an optical scanner, and an image forming apparatus. The casing structure includes a casing having an opening, a cover that covers the opening of the casing, and a seal disposed between the casing and the cover. In the casing structure, the cover is openable and closable with respect to the casing, and the seal contacting the casing and the cover when the cover is closed. In the casing structure, the casing or the cover including at least one portion contained in the seal in a cross section taken in a direction the cover is opened or closed. The optical scanner includes the casing structure. In the optical scanner, the casing stores a plurality of components to be applied to an image forming apparatus, and the cover has an optical element through which light passes. The image forming apparatus includes the optical scanner.

11 Claims, 27 Drawing Sheets

(56) References Cited

U.S. PATENT DOCUMENTS

| | | |
|---|---|---|
| 2005/0174418 A1 | 8/2005 | Sakaue et al. |
| 2006/0055769 A1 | 3/2006 | Yamazaki et al. |
| 2007/0053040 A1 | 3/2007 | Sakaue et al. |
| 2007/0064087 A1 | 3/2007 | Matsumae et al. |
| 2007/0070173 A1 | 3/2007 | Yamakawa et al. |
| 2007/0122192 A1 | 5/2007 | Yamakawa et al. |
| 2007/0139745 A1 | 6/2007 | Shoji et al. |
| 2007/0153079 A1 | 7/2007 | Sakaue et al. |
| 2007/0165099 A1 | 7/2007 | Yoshizawa et al. |
| 2007/0188589 A1 | 8/2007 | Kusunose et al. |
| 2009/0022520 A1 | 1/2009 | Sakaue et al. |
| 2009/0058981 A1 | 3/2009 | Higaki et al. |
| 2009/0066780 A1 | 3/2009 | Bannai et al. |
| 2009/0295899 A1 | 12/2009 | Watanabe et al. |
| 2010/0033787 A1 | 2/2010 | Serizawa et al. |
| 2010/0321461 A1 | 12/2010 | Shoji et al. |
| 2011/0316957 A1 | 12/2011 | Sakaue et al. |
| 2011/0316958 A1 | 12/2011 | Johno et al. |
| 2012/0062685 A1 | 3/2012 | Serizawa et al. |
| 2012/0300007 A1 | 11/2012 | Fujii et al. |
| 2013/0070042 A1 | 3/2013 | Yamakawa et al. |
| 2013/0188004 A1 | 7/2013 | Arai et al. |
| 2013/0194370 A1 | 8/2013 | Sakaue et al. |
| 2013/0251407 A1 | 9/2013 | Serizawa et al. |
| 2014/0354757 A1 | 12/2014 | Narita et al. |
| 2015/0153705 A1 | 6/2015 | Sakaue et al. |
| 2016/0147193 A1 | 5/2016 | Yoshida et al. |
| 2016/0161906 A1 | 6/2016 | Watanabe et al. |
| 2017/0068181 A1* | 3/2017 | Otsubo ............... G03G 15/0409 |
| 2021/0318536 A1 | 10/2021 | Sakaue et al. |
| 2022/0294926 A1* | 9/2022 | Narita ................ G03G 21/1666 |

FOREIGN PATENT DOCUMENTS

| | | |
|---|---|---|
| JP | 2015-051567 | 3/2015 |
| JP | 2015-075654 | 4/2015 |
| JP | 2016-099459 | 5/2016 |

* cited by examiner

OPENING AND CLOSING DIRECTION OF COVER

CASING STRUCTURE, OPTICAL SCANNER, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-045753 and 2022-173554, filed on Mar. 22, 2022, and Oct. 28, 2022, respectively, in the Japan Patent Office, the entire disclosures of which are hereby incorporated by reference herein.

BACKGROUND

Technical Field

Embodiments of the present disclosure relate to a casing structure, an optical scanner, and an image forming apparatus.

Background Art

For image forming apparatuses that adopt electrophotography, some technologies have been proposed to achieve the hermeticity of a unit through a seal arranged between a cover and the casing of the unit. Due to such a configuration, the dust inside the image forming apparatus can be prevented from intruding into the unit.

As described above, the casing structure in which the seal is arranged between the cover and the casing of the unit has been proposed. As the cover is attached to the casing, the seal is compressed and deformed so as to seal the space between the cover and the casing of the unit. Some holes are formed on the adhesive portions of the cover to which the seal is attached. Those holes extends in the thickness direction of the bottom portion of the cover and in the reverse direction of the direction in which the exterior walls of the cover extend. Due to such a configuration, a casing with a relatively simple configuration or structure in which the airtightness inside the casing over time can be achieved.

Optical units have been proposed in which a frame and its cover are fixed using, for example, a stepped screw having a step higher than the thickness of the cover. In such optical units, an elastic shock absorber or cushioning is arranged between the cover and the frame. The total of the thickness of the cover and the thickness of the shock absorber or cushioning is made larger than the height of the stepped portion of the stepped screw. Due to such a configuration, high-quality image recording free from, for example, color shift and color irregularities can be stably performed regardless of, for example, the installation environment of the apparatus and the heat generation of the apparatus itself.

SUMMARY

Embodiments of the present disclosure described herein provide a casing structure, an optical scanner, and an image forming apparatus. The casing structure includes a casing having an opening, a cover that covers the opening of the casing, and a seal disposed between the casing and the cover. In the casing structure, the cover is openable and closable with respect to the casing, and the seal contacting the casing and the cover when the cover is closed. In the casing structure, the casing or the cover including at least one portion contained in the seal in a cross section taken in a direction the cover is opened or closed. The optical scanner includes the casing structure. In the optical scanner, the casing stores a plurality of components to be applied to an image forming apparatus, and the cover has an optical element through which light passes. The image forming apparatus includes the optical scanner.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
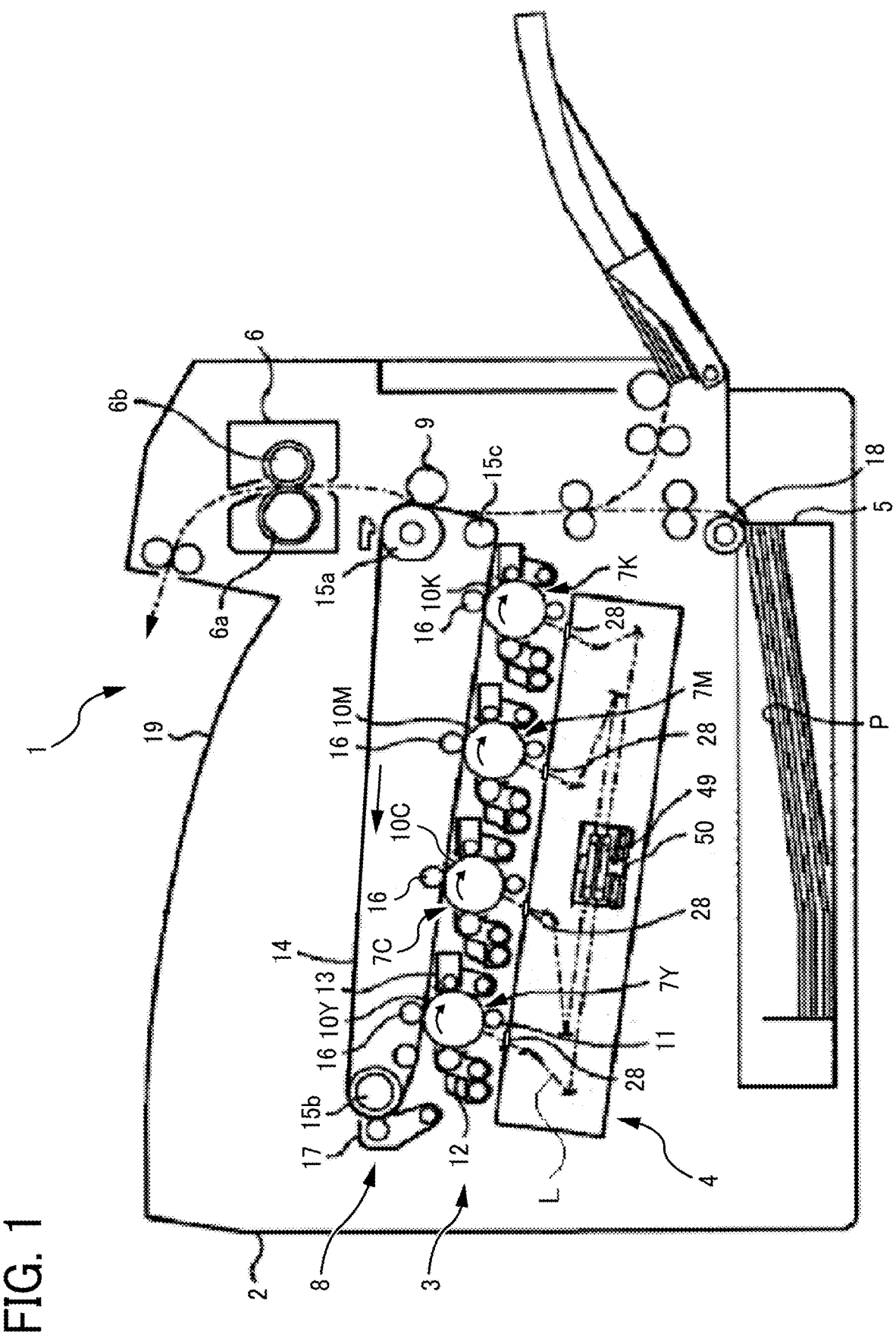
FIG. 1 is a schematic diagram illustrating an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A casing structure, an optical scanner, and an image forming apparatus according to an embodiment of the present disclosure are described below with reference to the drawings. Embodiments of the present disclosure are described below, but the present disclosure is not limited to those embodiments and various applications and modifications may be made without departing from the scope of the disclosure.

A casing structure according to an embodiment of the present disclosure includes a casing having an opening and a cover that covers the opening of the casing. In the casing structure according to such an embodiment of the present disclosure, the cover is openable and closable with respect to the casing, and a seal disposed between the casing and the cover. Moreover, in the casing structure according to such an embodiment of the present disclosure, the seal contacting the casing and the cover when the cover is closed, and the casing or the cover is at least partially contained in the seal in the cross sections taken in a direction the cover is opened and closed.

An optical scanner according to an embodiment of the present disclosure has the casing structure according to the above embodiment of the present disclosure. In the optical scanner according to such an embodiment of the present disclosure, the casing structure stores components or elements that can be applied to an image forming apparatus, and the cover has an optical element through which light passes. The optical scanner according to the above embodiment of the present disclosure can be used as, for example, an electrophotographic exposure device, or can be used or diverted not only as a writing device but also as a reading device. The optical scanner according to the present embodiment may be referred to as, for example, a light irradiation device.

An image forming apparatus according to an embodiment of the present disclosure is provided with the optical scanner according to an embodiment of the present disclosure.

According to one aspect of the present disclosure, the seal can be prevented from peeling off from the casing or the cover when the cover is opened from the casing, and the seal can be kept on the casing or the cover. Accordingly, the level of recycling processability can be increased. In the embodiments of the present disclosure, the seal is used and arranged between the casing and the cover. Due to such a configuration, the level of hermeticity inside the casing can be increased, and the dust inside the image forming apparatus that adopts electrophotography can be prevented from entering the casing.

FIG. 1 is a schematic diagram illustrating the image forming apparatus 1 according to an embodiment of the present disclosure.

Embodiments of the present disclosure relate to a full-color image forming apparatus. The image forming apparatus 1 according to the present embodiment is provided with four latent-image bearers. The four latent-image bearers according to the present embodiment are photoconductors 10Y, 10C, 10M, 10K that are shaped like drums, and these photoconductors are arranged in tandem.

The image forming apparatus 1 according to the present embodiment is provided with a plurality of image forming devices 7Y, 7C, 7M, and 7K. Those photoconductors 10Y, 10C, 10M, 10K partially serve as the four image forming devices 7Y, 7C, 7M, and 7K that handle multicolor toners. Those four image forming devices 7Y, 7C, 7M, and 7K according to the present embodiment handle multicolor toner including yellow (Y), cyan (C), magenta (M), and black (BK), respectively, and can form a color image using the multicolor toner.

The image forming apparatus 1 according to the present embodiment is provided with an intermediate transfer belt 14. The intermediate transfer belt 14 according to the present embodiment serves as a surface moving unit, and is supported by, for example, three support rollers 15a, 15b, and 15c and rotates on the axis. The moving direction of the intermediate transfer belt 14 is indicated by an arrow in FIG. 1. The image forming devices 7Y, 7C, 7M, and 7K are arranged at even intervals along a lower stretch line of the intermediate transfer belt 14. Those four image forming devices 7Y, 7C, 7M, and 7K according to the present embodiment are arranged in the order listed from an upstream side to a downstream side in the moving direction of the intermediate transfer belt 14.

When a full-color image is formed, toner images are formed on the photoconductors 10Y, 10C, 10M, and 10K provided for the image forming devices 7Y, 7C, 7M, and 7K. The toner images that have been formed on the photoconductors 10Y, 10C, 10M, and 10K are sequentially superimposed on top of one another and transferred onto the intermediate transfer belt 14 by a plurality of primary transfer rollers 16. The multiple primary transfer rollers 16 according to the present embodiment serves as a plurality of transfer devices, and are arranged to face the photoconductors 10Y, 10C, 10M, and 10K, respectively. More specifically, a plurality of portions on the intermediate transfer belt 14 that the multiple primary transfer rollers 16 contact are referred to as, for example, transfer positions, and transfer is performed at those transfer positions.

The four toner images that have been transferred to the intermediate transfer belt 14 are collectively transferred to a recording medium at the nip formed between the support roller 15a and the secondary transfer roller 9 all at once. Then, the recording medium passes between a pair of fixing rollers of the fixing device 6. As a result, the toner image transferred to the recording medium is fixed to the recording medium. Subsequently, the recording medium passes through the fixing device 6, and is ejected onto the output tray 19 by an output roller pair. As a result, a full-color image is formed on the recording medium.

A configuration or structure of the image forming devices 7Y, 7C, 7M, and 7K according to the present embodiment and how images are formed thereby is described below.

The image forming devices 7Y, 7C, 7M, and 7K are different from each other only in the color of toner to be handled, and the mechanical structure and image forming processes are shared in common. Accordingly, in the following description, any one of the image forming devices such as the image forming device 7Y can be described by way of example. In the following description of the present disclosure, like reference signs denote like elements including the image forming devices 7Y, 7C, 7M, and 7K and the photoconductors 10Y, 10C, 10M, and 10K.

In the image forming device 7Y, for example, a plurality of charging rollers 11, the positions irradiated with the light beams L, a plurality of developing devices 12, the multiple primary transfer rollers 16, and a plurality of cleaning devices 13 are arranged around the photoconductor 10Y in the clockwise rotation direction. Each one of the multiple charging rollers 11 according to the present embodiment serves as a charger, and each one of the multiple developing devices 12 according to the present embodiment serves as a developing module.

The light beam L is emitted from the optical writing device 4. The optical writing device 4 according to the present embodiment serves as an optical scanner. Inside the optical writing device 4, for example, a semiconductor laser that serves as a light source 41, a coupling lens, an fθ lens, a toroidal lens, a mirror, a deflective device are arranged. In the optical writing device 4 according to the present embodiment, the light beam L of each color is emitted toward each one of the multiple photoconductors, and irradiates a writing position on the photoconductor 10Y with the light beam L to form electrostatic latent images. The details will be described later.

The multiple developing devices 12 store developers of each color such as a yellow developer. The multiple developing devices 12 visualize the electrostatic latent images on the photoconductors 10Y, 10C, 10M, and 10K as toner images. When the amount of developer stored in the multiple developing devices 12 decreases, the developer is replenished from a toner bottle as necessary. The other image forming devices also contain developers of other different colors, and visualize the electrostatic latent images with the developers of those different colors.

For example, images are formed as follows. The photoconductor 10Y is driven to rotate and is evenly charged by corresponding one of the multiple charging rollers 11. The photoconductor 10Y is irradiated with the light beam L including the yellow image data at the writing position, and an electrostatic latent image is formed on the photoconductor 10Y. When the electrostatic latent image passes through corresponding one of the multiple developing devices 12, the electrostatic latent image is visualized by yellow (Y) toner. A yellow (Y) toner image that is formed on the photoconductor 10Y is transferred onto the intermediate transfer belt 14 by corresponding one of the primary transfer rollers 16. Subsequently, a cyan toner image, a magenta toner image, and a black toner image are sequentially superimposed on top of one another and transferred onto the intermediate transfer belt 14 by the image forming device 7C, the image forming device 7M, and the image forming device 7K, respectively.

As described above, the four toner images that have been superimposed on top of one another and transferred to the intermediate transfer belt 14 are collectively transferred to a recording medium at the nip formed between the support roller 15a and the secondary transfer roller 9 all at once. The recording medium is conveyed at the same time as when the toner image on the intermediate transfer belt 14 reaches the secondary transfer roller 9. The recording medium is fed and conveyed by, for example, a sheet feeder 5 and a registration roller.

On the other hand, the residual toner is removed by the cleaning device 13 on the multiple photoconductors 10Y, 10C, 10M, and 10K that have completed one transfer process. Subsequently, the electricity is removed by an electric-charge removing lamp, and the multiple photoconductors 10Y, 10C. 10M, and 10K get prepared for the next image formation. In a similar manner, the residual toner or the like on the intermediate transfer belt 14 is removed by the cleaning device 17.

As described above, the image forming apparatus 1 according to the present embodiment adopts a methodology in which the toner images on the multiple photoconductors 10Y, 10C, 10M, and 10K are once superimposed on top of one another for the transfer on the intermediate transfer belt 14 and then are transferred onto a recording medium all at once. However, the embodiments of the present disclosure are not limited to this methodology or like methods. For example, a method or methodology may be adopted in which the intermediate transfer belt 14 is replaced with a conveyance belt that conveys a recording medium. In such a method or methodology, the recording medium is placed on such a conveyance belt and the recording medium is conveyed. In the course of process in which the recording medium is conveyed, the toner images on multiple photoconductors are sequentially transferred onto a recording medium and are superimposed on top of one another. Then, the toner image is fixed to form a full color image.

In the above embodiments of the present disclosure, apparatuses that can form color images are described by way of example. However, no limitation is indicated thereby, and the embodiments of the present disclosure may be applied to apparatuses that form monochrome images.

The optical writing device 4 that emits the light beam L is described below with reference to FIG. 2 and FIG. 3.

Figure 2:
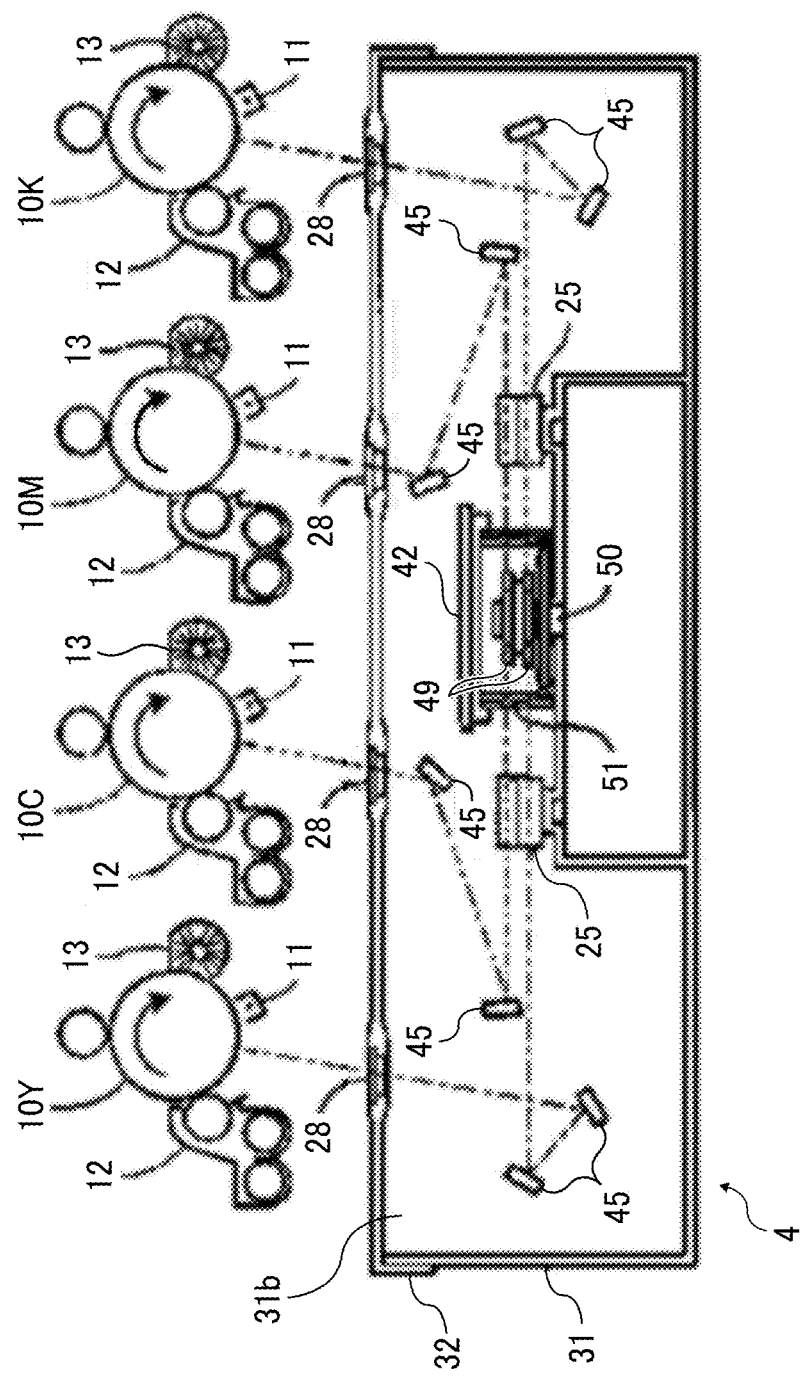
FIG. 2 is a schematic diagram illustrating an optical scanner provided for the image forming apparatus of FIG. 1, according to an embodiment of the present disclosure.

FIG. 2 is a schematic diagram illustrating an optical writing device 4 provided for the image forming apparatus 1 of FIG. 1, according to the present embodiment.

Figure 3:
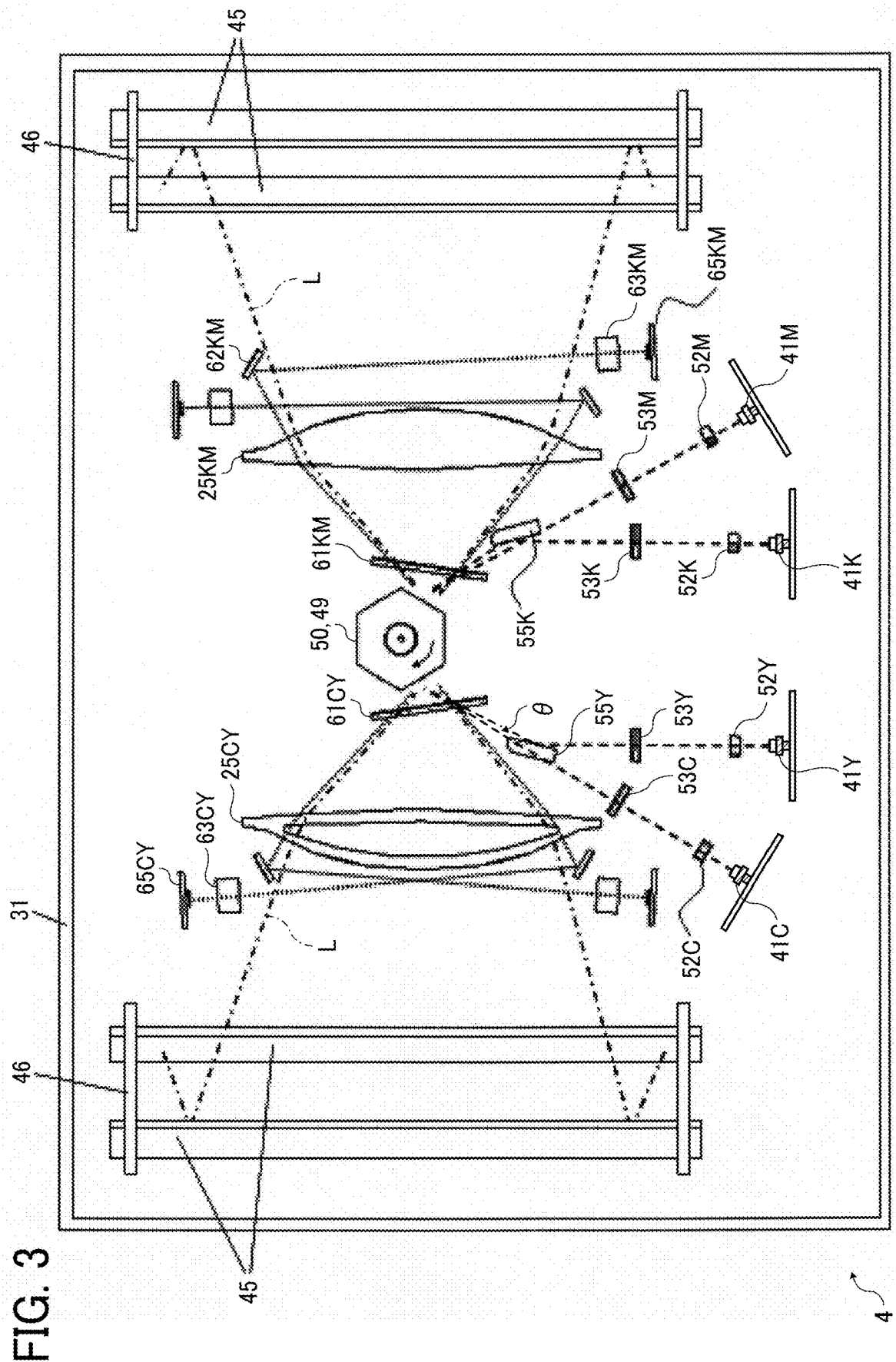
FIG. 3 is a schematic plan view of the optical scanner of FIG. 2, according to an embodiment of the present disclosure.

FIG. 3 is a schematic plan view of the optical writing device 4 of FIG. 2, according to the present embodiment.

In the present embodiment described with reference to FIG. 2 and FIG. 3, the optical writing device 4 is a tandem-type scanning optical system and adopts a scanning lens system. However, no limitation is intended thereby, and the optical writing device 4 according to the present embodiment may be applied to, for example, a scanning optical system that adopts a scanning mirror system.

In the optical writing device 4 according to the present embodiment, for example, a deflective device 50 that serves as a main-scanning line deflective device, and optical elements such as various kinds of reflection mirrors and various types of lenses are arranged inside the casing 31. The optical writing device 4 according to the present embodiment is provided with a plurality of light sources 41K, 41M, 41C, and 41Y that correspond to a plurality of photoconductors 10K, 10M, 10C, and 10Y, respectively, and emit a plurality of light beams L. The multiple light sources 41K, 41M, 41C, and 41Y according to the present embodiment serve as a light beam emitting unit. Typically, a general-purpose semiconductor laser diode (LD) is used as the light sources and soldered to the control board.

On the optical path of light beams L between the multiple light sources 41 and the mirror unit 49 of the deflective device 50, a collimator lens 52 and a cylinder lens 53 are arranged for each one of the multiple light sources 41. On the optical path of the light beam L between the mirror unit 49 of the deflective device 50 and the multiple photoconductors 10Y, 10C, 10M, and 10K, a pair of scanning lenses 25CY and 25KM and a pair of mirrors 45 are arranged for the corresponding pair of the multiple light sources 41. The second scanning lens may be arranged on the optical path of the light beams L between the multiple photoconductors and the scanning lenses 25CY and 25KM.

A plurality of reflection mirrors 55 such as a pair of reflection mirrors 55Y and 55K may be arranged on the optical path of light beams L between the multiple light sources 41 and the mirror unit 49 of the deflective device 50.

The light beams that are emitted from the multiple light sources 41 are approximately collimated by the multiple collimator lenses 52 such as the collimator lens 52C, the collimator lens 52Y, the collimator lens 52K, and the collimator lens 52M, and pass through an aperture. As a result, the light beam L of a desired shape is formed. The light beam L that has passed through the aperture is incident on the multiple cylinder lenses 53 including the cylinder lens 53C, the cylinder lens 53Y, the cylinder lens 53K, and the cylinder lens 53M. The light beam is condensed by the cylinder lens 53. The light beam L that has passed through the cylinder lens 53 is incident on a plurality of soundproofing glasses 51 such as a soundproofing glass 51CY and a soundproofing glass 51KM.

The light beam L that has passed through the soundproofing glass 51 is incident on a side of the mirror unit 49 of the deflective device 50 that serves as a main-scanning line deflective device. Subsequently, the light beam L is incident on the other side of the mirror unit 49 of the deflective device 50, and is deflected and scanned in the direction of the main scanning line. Then, the light beam L passes through the soundproofing glass 51 again and passes through the scanning lens 25. As a result, the light beam L is corrected so as to scan the surfaces of the multiple photoconductors 10 at a constant speed.

The tilt of the light beam L that is caused by the surface of the mirror unit 49 of the deflective device 50 is corrected, and then is reflected by the mirror 45. Then, the light beam L passes through the dustproofing glass 28 attached to the cover 32 to go out to the outside of the optical writing device 4, and is emitted to the surface of the corresponding one of the multiple photoconductors 10.

The optical writing device 4 according to the present embodiment may be provided with synchronous detection mechanisms for determining the writing position of black (B or BK) images and magenta (M) images. For example, such synchronous detection mechanisms detect the timing at which writing operation is performed as follows. The light beam L that has passed through the scanning lens 25 is reflected by the synchronization mirror 62KM, and passes through the synchronous lens 63KM to reach a photo integrated circuit (IC) implemented on the control board 65KM. As a result, the timing at which writing operation is performed is detected. The same applies to the optical systems that correspond to the photoconductor 10C of cyan (C) color and the photoconductor 10Y of yellow (Y) color.

These optical elements are arranged inside the casing 31, and an opening 31b on the top side of the casing 31 is closed by the cover 32. The cover 32 is provided with a dustproofing glass 28 through which the light beam L can pass, and the light beam L passes through the dustproofing glass 28 and reaches the photoconductor 10.

In the image forming apparatus 1 as described above, there is some concern that the dust in the apparatus may enter or go into the inside of the optical scanning device such as the optical writing device 4. For example, the optical scanner needs to operate in an environment where toner flies around. For this reason, it is necessary to prevent optical elements from being contaminated by the toner or the like and to prevent the optical characteristics from deteriorating. In order to handle such a situation, some technologies have been proposed in the related art that the seal is used and arranged between the casing and the cover such that the dust in the apparatus does not enter the casing. As the seal is arranged, the airtightness of the optical scanner can be achieved at a sufficiently high degree.

However, in the related art, the seal tends to peel from a member of interest when the cover is opened. For example, when the seal is arranged on the cover, there are some cases in which the seal unintentionally peels from the cover despite the fact that the seal is to be kept on the cover. In such cases, the processability when the apparatus or members are to be reused or recycled tends to deteriorate. For example, it may become necessary to reattach the seal that has peeled off the casing or the cover. When the seal partially peels off, it may become necessary to remove all of the seal and reattach the seal.

By contrast, in the optical scanner according to the present embodiment, the cover is openable and closable with respect to the casing, and a seal is arranged between the casing and the cover. In the optical scanner according to the present embodiment, the seal contacts the casing and the cover when the cover is closed, and the casing or the cover is at least partially contained in the seal in the cross sections taken in a direction the cover is opened and closed. According to such a configuration, the seal can be prevented from peeling off from the cover when the cover is opened from the casing, and the seal can be kept on the cover. Accordingly, the level of recycling processability can be increased.

Some embodiments of the present disclosure are described below with reference to FIG. 4 to FIG. 10.

Figure 4:
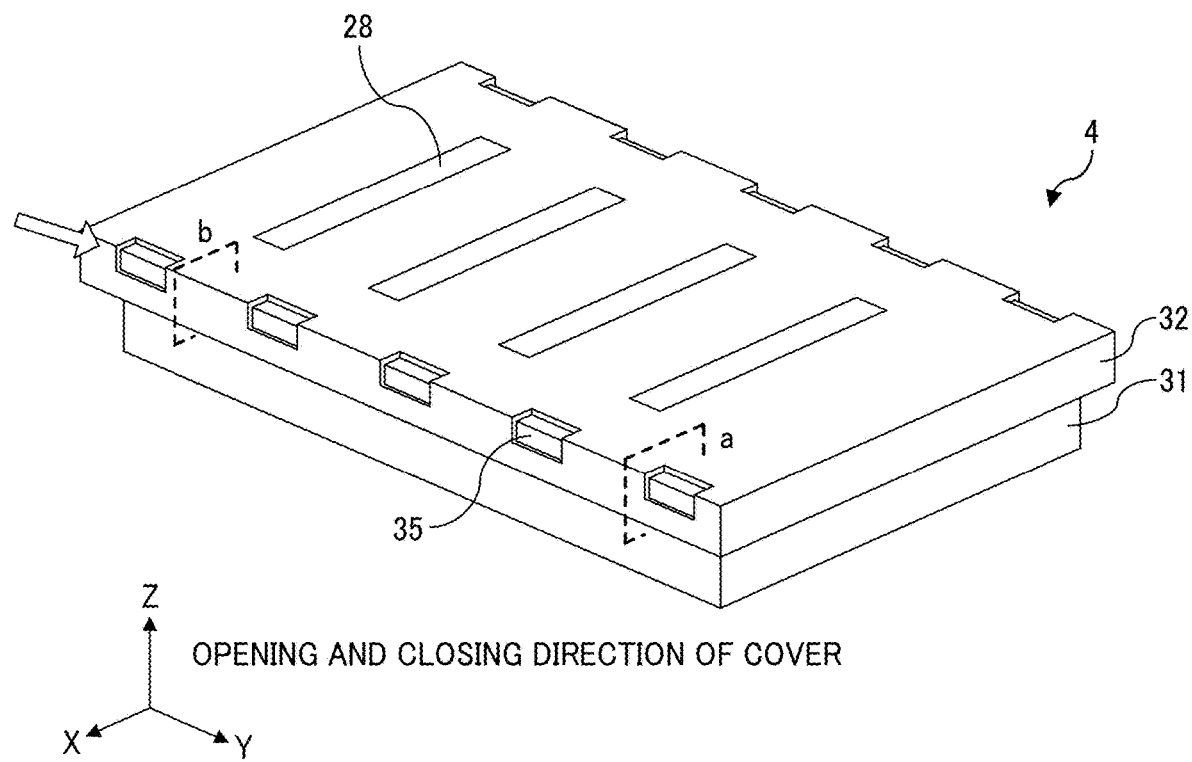
FIG. 4 is a schematic perspective view of a casing structure in which a cover is closed, according to an embodiment of the present disclosure.

FIG. 4 is a schematic perspective view of the optical scanner in which the casing 31 is closed with the cover 32, according to the present embodiment.

Figure 6:
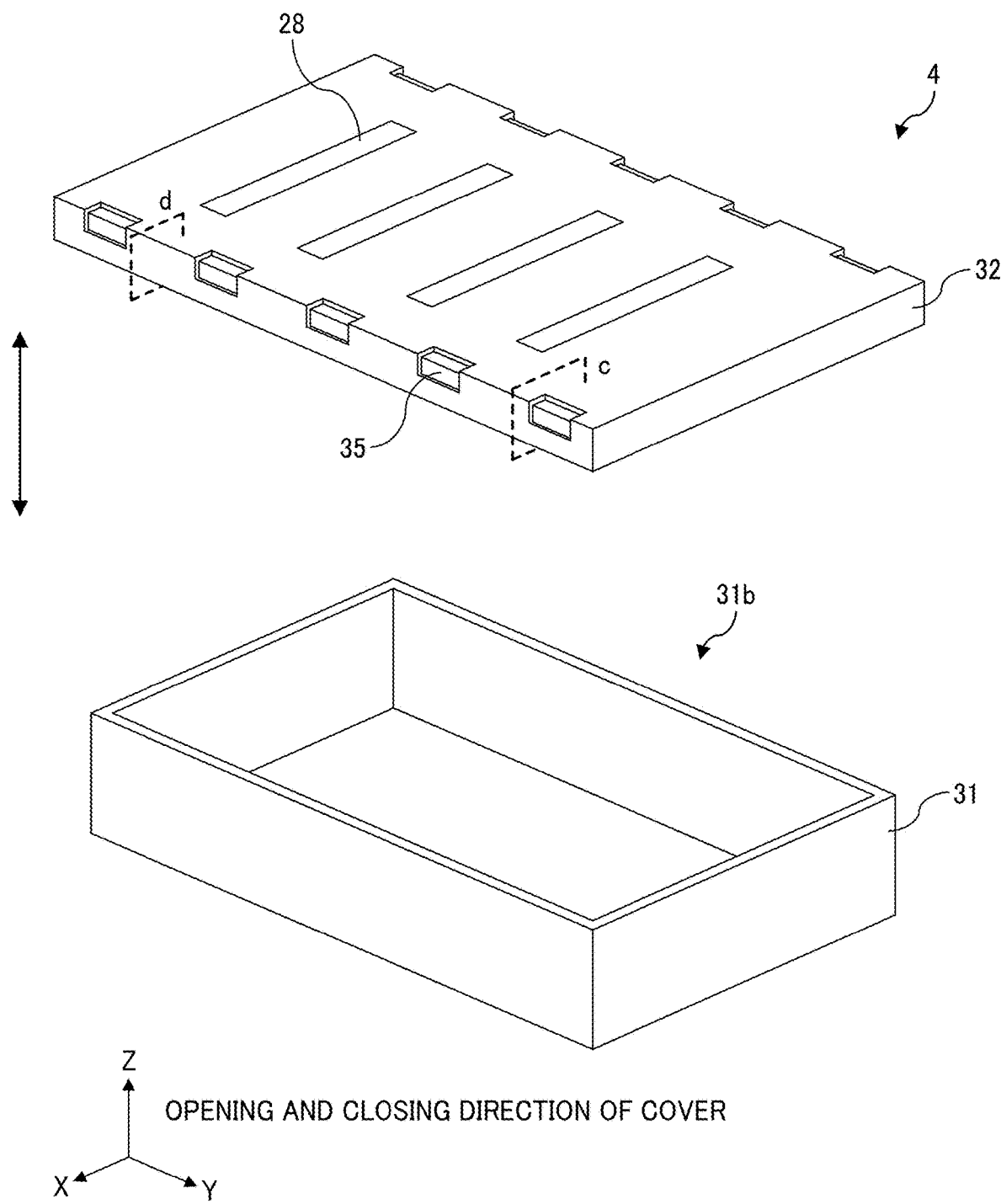
FIG. 6 is another schematic perspective view of a casing structure in which a cover is opened, according to an embodiment of the present disclosure.

FIG. 6 is another schematic perspective view of the optical scanner similar to FIG. 4, where the cover 32 is opened, according to the present embodiment.

As illustrated in FIG. 6, it is assumed in the present embodiment that the cover 32 is opened and closed in the Z-axis direction.

As described above with reference to, for example, FIG. 1, FIG. 2, and FIG. 3, components or elements that can be applied to the image forming apparatus 1 are stored inside the casing 31. In FIG. 6, the opening 31b of the casing 31 is illustrated.

As illustrated in FIG. 4 and FIG. 6, the cover 32 according to the present embodiment is provided with a plurality of dustproofing glasses 28 that correspond to the multiple photoconductors 10Y, 10C, 10M, and 10K. No limitation is intended, but those dustproofing glasses 28 according to the present embodiment may be attached to the cover 32 using, for example, a double-sided adhesive tape. It is desired that the dustproofing glass 28 be used because the dust in the apparatus is hardly accumulated. However, no limitation is indicated thereby, and any desired optical element through which the light beam L can pass may be used.

Figure 5A:
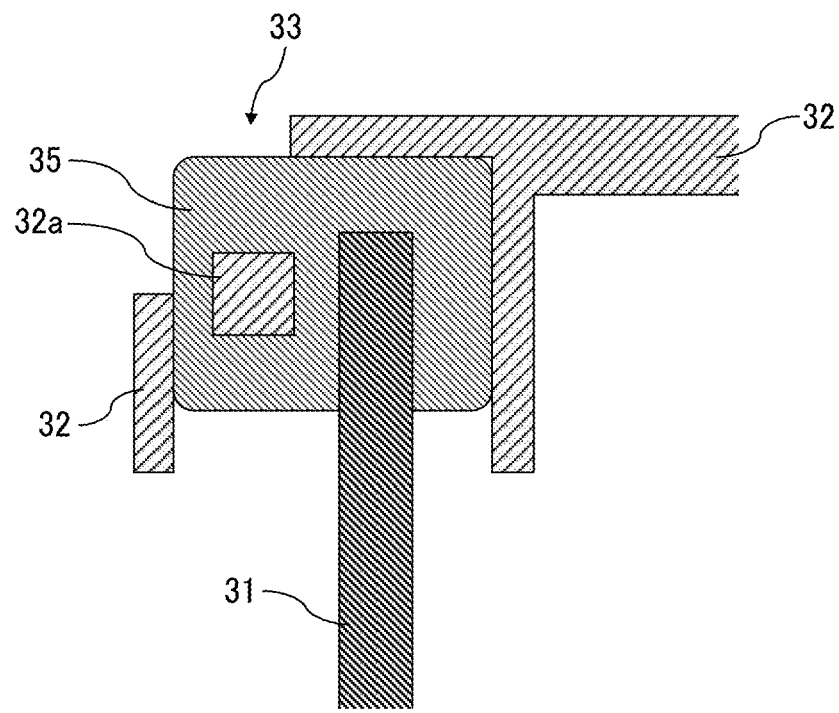
FIG. 5A is a schematic sectional view indicated by a in FIG. 4, according to an embodiment of the present disclosure.
Figure 5B:
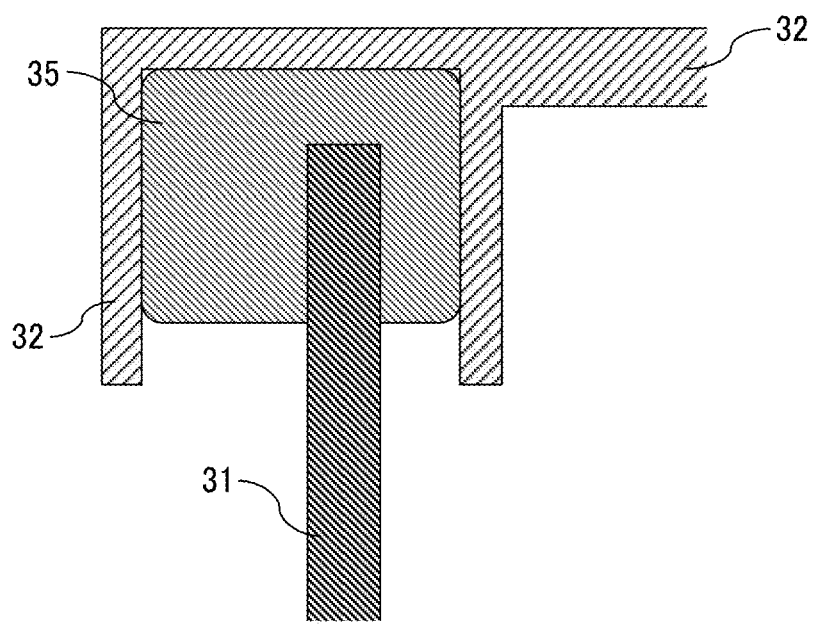
FIG. 5B is a schematic sectional view indicated by b in FIG. 4, according to an embodiment of the present disclosure.

FIG. 5A and FIG. 5B are sectional views indicated in FIG. 4, and those cross sections are taken in a direction the cover 32 is opened and closed.

FIG. 5A illustrates the cross section indicated by a in FIG. 4, according to the present embodiment. FIG. 5B illustrates the cross section indicated by b in FIG. 4, according to the present embodiment. As illustrated in FIG. 5A, the cover 32 according to the present embodiment is provided with a hook 32a contained in the seal 35 in the cross sections taken in a direction the cover 32 is opened and closed. As will be described later in detail, a plurality of hooks 32a are parts of the cover 32. In such a cross section, it can be said that the cross-sectional areas of a plurality of hooks 32a are contained in the cross-sectional area of the seal 35.

For example, the opening operation of the cover 32 may be regarded or referred to as the removal of the cover 32 from the casing 31 in the following description. For example, the closing operation of the cover 32 may be regarded or referred to as the attachment of the cover 32 to the casing 31 in the following description. A direction in which the cover 32 is opened or closed may be regarded or referred to as, for example, an opening and closing direction of the cover 32, and a cross section in the direction which the cover 32 is opened or closed may be regarded or referred to as, for example, an opening and closing cross section.

When it is described in the present disclosure that something moves or is arranged in a direction that the cover is opened or closed, such a thing may move or be arranged in a direction that the cover pivots about a side of the cover when the cover is opened or closed. The cover according to the present embodiment may be opened and closed in the Z-axis direction, or may be opened or closed at an angle with respect to the Z-axis direction. Alternatively, the direction in which the cover is opened or closed may be a straight line or a curved line.

The cover 32 according to the present embodiment is contained in the seal 35 in the cross sections taken in a direction the cover 32 is opened and closed. Due to such a configuration, the seal 35 can be prevented from being separated from the cover 32. Accordingly, the seal can be kept at any desired member. The seal 35 remains on the cover 32 when the cover 32 is opened from the casing 31 as illustrated in, for example, FIG. 5A. By contrast, when the cover 32 according to the present embodiment is not contained in the seal 35 in the cross sections taken in a direction the cover 32 is opened and closed, it is more likely that the seal 35 peels from the cover 32.

If the adhesive strength between the cover 32 and the seal 35 is sufficiently strong, it is unlikely that the seal 35 is taken by the casing 31 when the cover 32 is detached from the casing 31, and it is more likely that the seal 35 remains on the cover 32. However, if the adhesive strength between the cover 32 and the seal 35 is designed to increase, the selectivity in regard to, for example, the shape of the cover 32 and the materials for the seal 35 tends to decrease. When the seal 35 that increases the adhesive strength is used, the adhesive strength with the casing 31 also increases and it may become difficult to detach the cover 32 from the casing 31. For example, due to deterioration over time, the seal 35 may fixedly remain on the casing 31 in an unintentional manner. In such cases, the seal 35 tends to remain on the casing 31 when the cover 32 is detached from the casing 31. Moreover, the seal 35 may be damaged when the cover 32 is removed from the casing 31, and the recycling becomes difficult.

In order to deal with such a situation, the multiple hooks 32a are arranged in the present embodiment. Due to such a configuration, the tension is caused by the multiple hooks 32a, and it is more likely that the seal 35 remains on the cover 32. Due to such configurations as described above, it is not necessary to increase the adhesive strength between the cover 32 and the seal 35 excessively, and the selectivity in regard to, for example, the shape of the cover 32 and the materials for the seal 35 can be prevented from decreasing. The seal 35 can be prevented from being damaged when the cover 32 is to be removed from the casing 31, and the recycling becomes easy.

It is desired that the seal 35 be designed so as not to be cut accidentally due to the stress applied to the seal 35 itself when the cover 32 is opened from the casing 31. In such cases, the degree of processability of recycling can be increased.

As illustrated in, for example, FIG. 5A, it can be said that all the surrounding areas of the multiple hooks 32a are covered with the seal 35 when the cover 32 is contained in the seal 35 in the open and close cross section.

In the present embodiment, the cover 32 has the seal 35. However, no limitation is intended thereby, and the casing 31 according to the present embodiment may have the seal 35. Such an alternative embodiment of the present disclosure will be described later in detail.

Figure 7A:
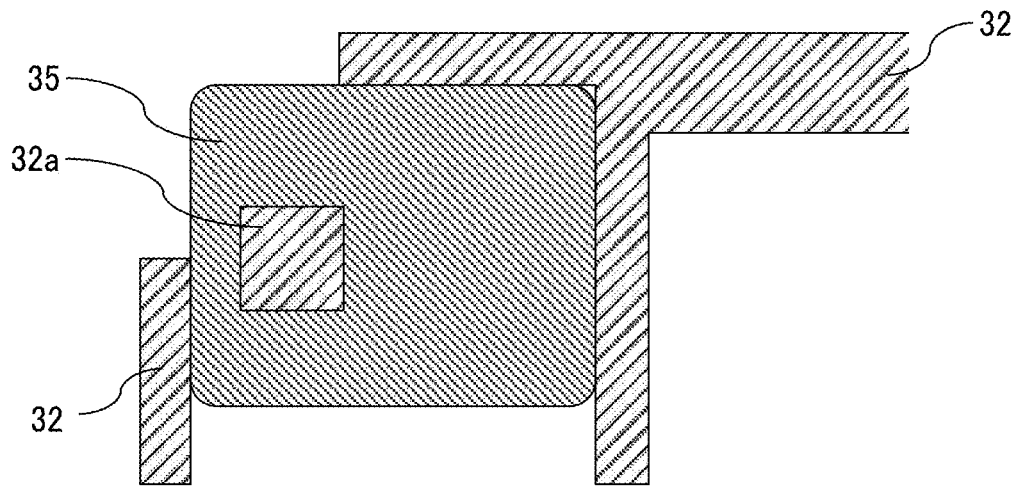
FIG. 7A is a schematic sectional view indicated by c in FIG. 6, according to an embodiment of the present disclosure.
Figure 7B:
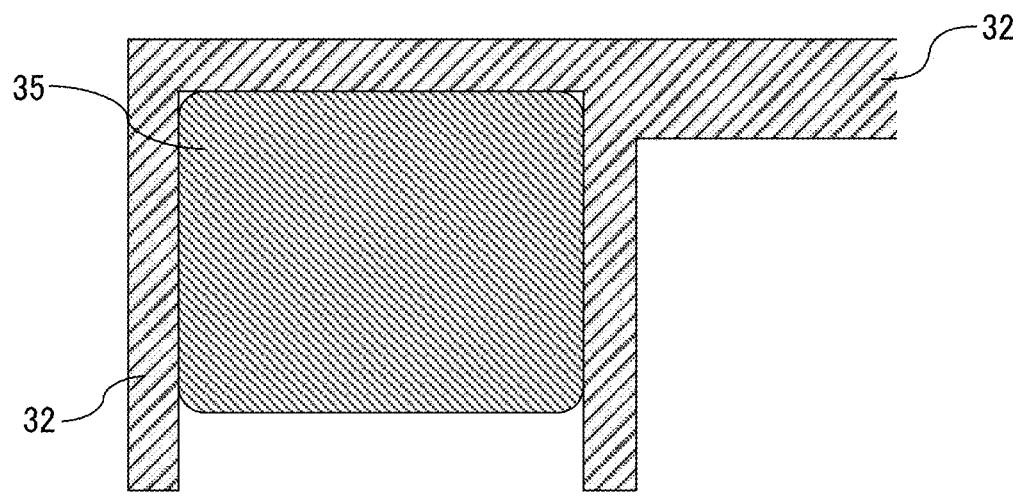
FIG. 7B is a schematic sectional view indicated by d in FIG. 6, according to an embodiment of the present disclosure.

FIG. 7A and FIG. 7B are sectional views indicated in FIG. 6, and those cross sections are taken in a direction the cover 32 is opened and closed.

FIG. 7A illustrates the cross section indicated by c in FIG. 6, according to the present embodiment. FIG. 7B illustrates the cross section indicated d b in FIG. 6, according to the present embodiment. As illustrated in FIG. 7A in a similar manner to FIG. 5A, the cover 32 according to the present embodiment is contained in the seal 35 in the cross sections taken in a direction the cover 32 is opened and closed.

FIG. 5B and FIG. 7B are diagrams illustrating that some portions of the cover 32 is not contained in the seal 35, according to the present embodiment. As illustrated in FIG. 5A and FIG. 7A, the cover 32 according to the present embodiment is at least partially contained in the seal 35 in the cross sections taken in a direction the cover 32 is opened and closed.

An embodiment in which the cover 32 is contained in the seal 35 in the open and close cross section is described below. In the open and close cross section, the cover 32 according to the present embodiment is provided with a hook 32a that is at least partially contained in the seal 35.

Figure 8A:
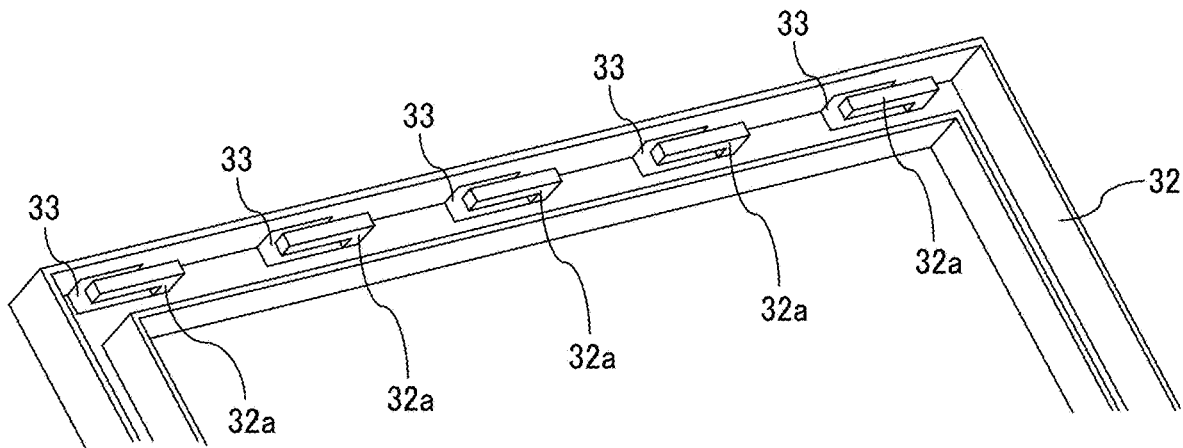
FIG. 8A is a schematic perspective view of the cover of FIG. 6 to which a seal is not attached, according to an embodiment of the present disclosure.

FIG. 8A is a schematic perspective view of the cover 32 of FIG. 6 when viewed from the casing 31 side, according to the present embodiment.

In the present embodiment, the cover 32 to which the seal 35 is not attached is described.

Figure 8B:
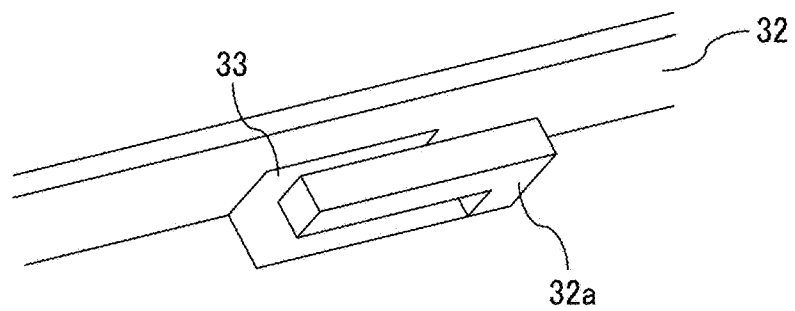
FIG. 8B is a schematic perspective view of a hook where a seal is not arranged, according to an embodiment of the present disclosure.

FIG. 8B is a schematic perspective view of the hook 32a, where a portion of the cover 32 of FIG. 8A is magnified for view, according to the present embodiment.

Figure 8C:
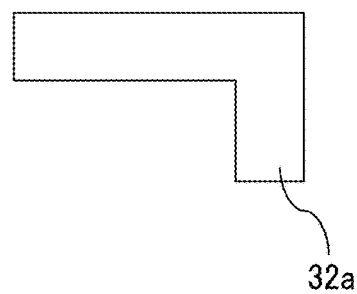
FIG. 8C is another schematic side view of a hook where a seal is not arranged, according to an embodiment of the present disclosure.

FIG. 8C is another side view of the hook 32a of FIG. 8B, which is viewed at an angle different from that of FIG. 8B, according to the present embodiment.

As illustrated in FIG. 8A, FIG. 8B, and FIG. 8C, the cover 32 according to the present embodiment is provided with the multiple hooks 32a. Due to such a configuration, as illustrated in FIG. 5A and FIG. 7A, the multiple hooks 32a are included in the seal 35 in the open and close cross section.

As illustrated in, for example, FIG. 8A, it is desired that the cover 32 according to the present embodiment be provided with the multiple hooks 32a. Due to such a configuration, the seal 35 can further be prevented from being separated from the cover 32.

Figure 9:
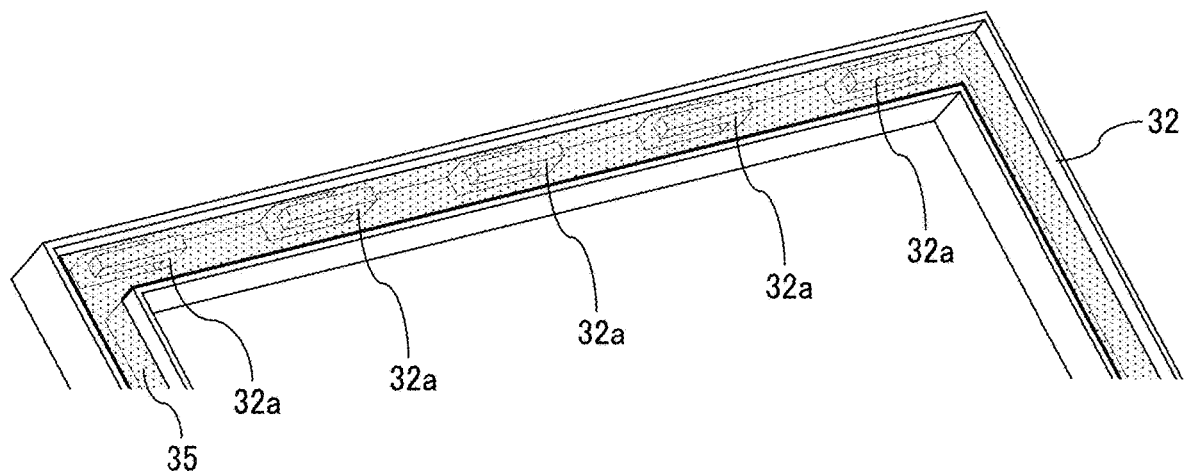
FIG. 9 is a schematic perspective view of the cover of FIG. 8A to which a seal is attached, according to an embodiment of the present disclosure.

FIG. 9 is a schematic perspective view of the cover 32 of FIG. 8A to which the seal 35 is attached, according to the present embodiment.

Under such conditions, as illustrated in FIG. 7A, the multiple hooks 32a are included in the seal 35 in the open and close cross section. For example, as illustrated in FIG. 8A, the cover 32 according to the present embodiment has a trench for molding in which the seal 35 is arranged, and a material of the seal 35 such as hotmelt is poured into the groove.

Figure 10A:
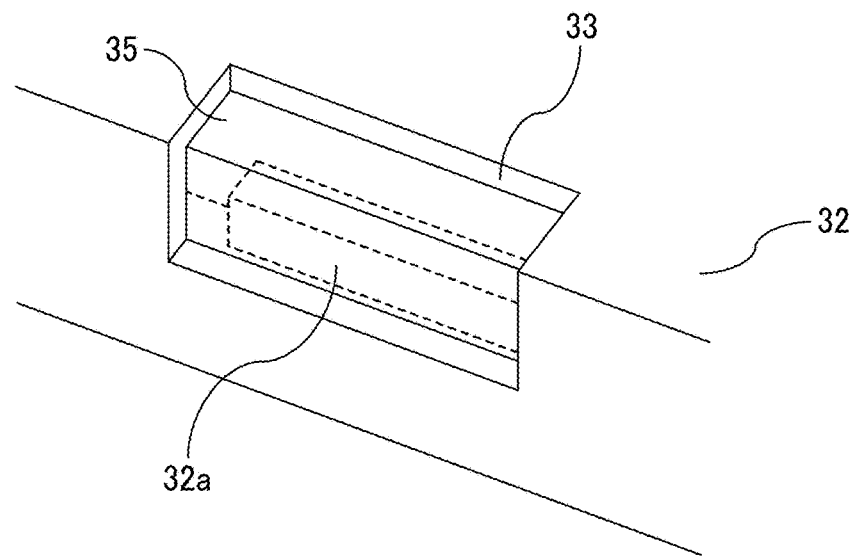
FIG. 10A is a schematic perspective view of the cover of FIG. 4 according to an embodiment of the present disclosure.
Figure 10B:
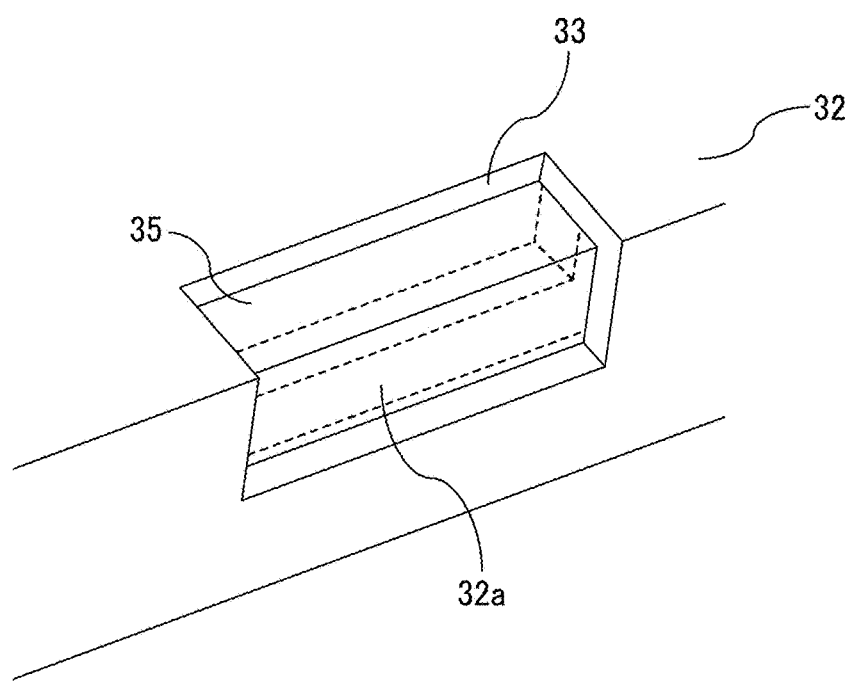
FIG. 10B is another schematic perspective view of the cover of FIG. 4 according to an embodiment of the present disclosure.

FIG. 10A and FIG. 10B are schematic perspective views of a portion of the cover 32 illustrated in FIG. 4 and FIG. 6, according to the present embodiment FIG. 10B is a diagram illustrating the cover 32 as viewed in the direction indicated by the hollow arrow in FIG. 4, according to the present embodiment. Although no limitation is indicated thereby, for example, the cover 32 may have a plurality of openings 33 at the positions corresponding to the multiple hook 32a, and the material of the seal 35 may be poured from the opening 33. In such cases, it becomes easier to cover the multiple hooks 32a with the seal 35. The multiple openings 33 may be sealed by different members.

As illustrated in, for example, FIG. 8A, FIG. 8B, and FIG. 8C, the multiple hooks 32a according to the present embodiment extend in a direction different from the direction in which the cover 32 is opened or closed. Due to such a configuration as described above, the seal 35 can be prevented from peeling off when the cover 32 is opened or closed. As one side of each one of the multiple hooks 32a is separated from the cover 32 as in the present embodiment, for example, the seal 35 can be detached by sliding the seal 85 in the direction the multiple hooks 32a extend. Accordingly, for example, it is no longer necessary to cut the seal 35, and the degree of processability when the seal 35 is removed can be increased. For example, the degree of processability when the apparatus is disassembled in a factory can be increased.

The material of the seal 35 is not limited, and may be any desired material. For example, elastomer, foam, and silicon may be used as the materials for the seal 35. In such cases, the degree of elasticity of the seal 35 can be increased, and the degree of adhesion between the casing 31 and the cover 32 can be increased. Moreover, a high degree of hermeticity can be achieved. In the present embodiment, for example, molding can be done easily even when a seal that is made of elastomer or the like is used, and the seal 35 can be kept at desired one of the casing 31 or the cover 32 when the cover 32 is detached from the casing 31.

A method of forming the seal 35 is not limited, and any desired method can be selected. For example, injection molding may be adopted. When molding is done using the injection molding, molding may be performed through the multiple openings 33. The material may be heated by a heating unit such as a melter, and the heated material may be poured to perform moldings.

Some alternative embodiments of the present disclosure are described below. Redundant descriptions of the same matters as those described above may be omitted in the following description.

Figure 11A:
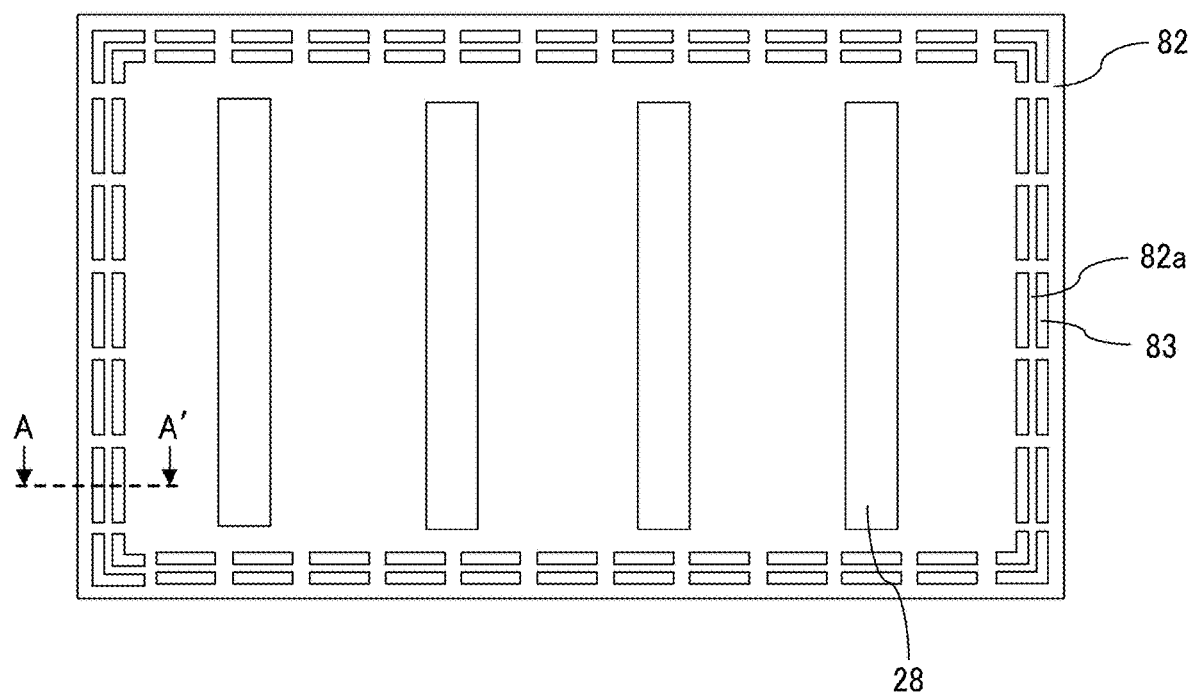
FIG. 11A is a schematic plan view of a cover according to an alternative embodiment of the present disclosure.

FIG. 11A is a schematic plan view of a cover according to an alternative embodiment of the present disclosure.

Figure 11B:
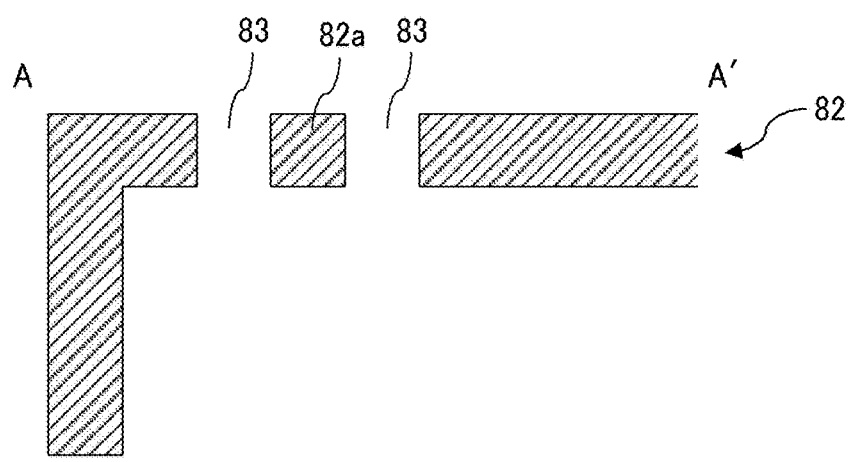
FIG. 11B is a schematic A-A' sectional view of the cover of FIG. 11A, according to an alternative embodiment of the present disclosure.

FIG. 11B is an A-A' sectional view of the cover 82 of FIG. 11A, according to the alternative embodiment of the present disclosure.

Figure 12A:
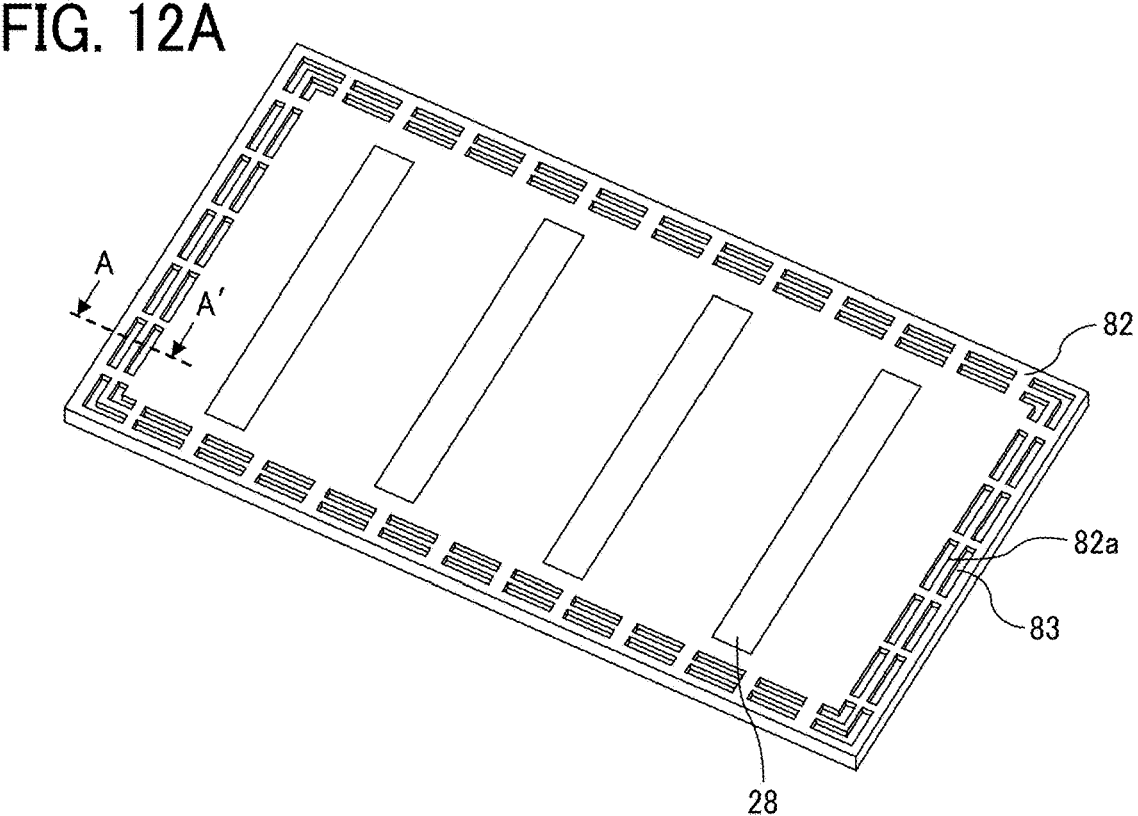
FIG. 12A is a schematic perspective view of the cover of FIG. 11A and FIG. 11B, according to an alternative embodiment of the present disclosure.

FIG. 12A is a schematic perspective view of the cover 82 of FIG. 11A and FIG. 11B when viewed from the outside of the casing 31, according to an alternative embodiment of the present disclosure.

Figure 12B:
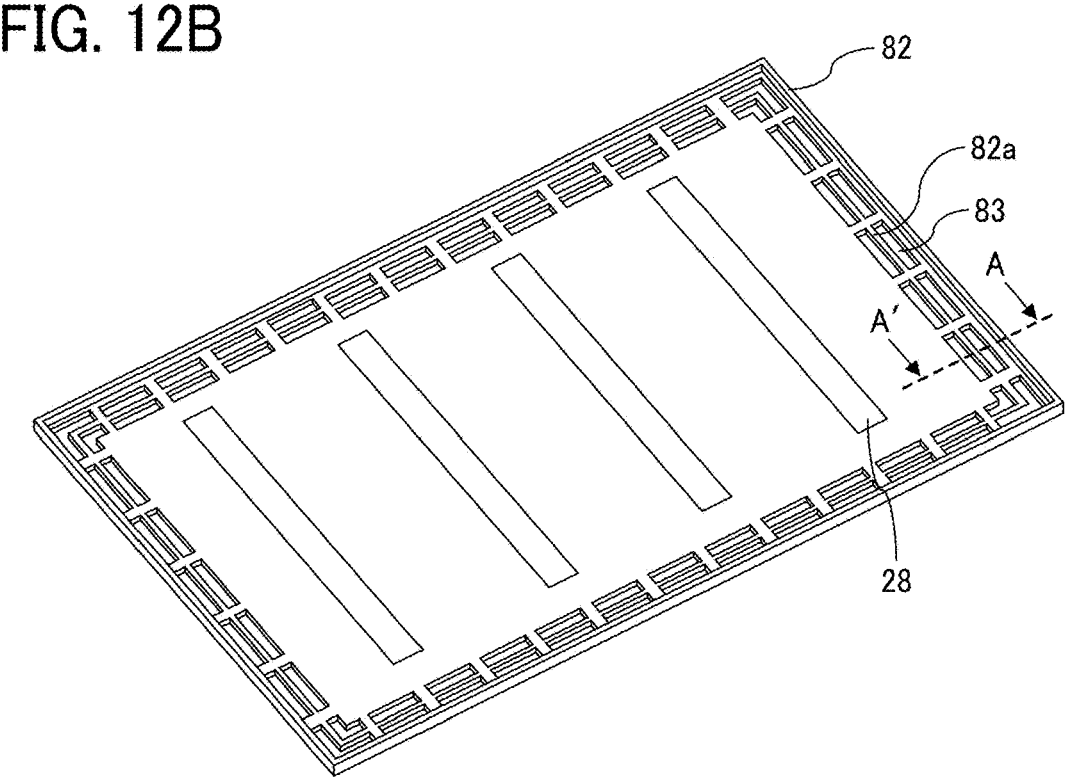
FIG. 12B is another schematic perspective view of the cover of FIG. 11A and FIG. 11B, according to an alternative embodiment of the present disclosure.

FIG. 12B is another schematic perspective view of the cover 82 of FIG. 11A and FIG. 11B when viewed from the inside of the casing 31, according to an alternative embodiment of the present disclosure.

The cover 82 according to the present embodiment has a plurality of openings 83, and each one of the multiple hooks 82a is interposed between a pair of the multiple openings 83 of the cover 82. Even when the multiple hooks 82a have such a configuration, the multiple hooks 82a can be contained in the seal 85 in the open and close cross section.

Cases in which the seal 85 is arranged on the cover 82 according to the above embodiments of the present disclosure are described below with reference to FIG. 13A, FIG. 13B, FIG. 13C, FIG. 13D, FIG. 14A, FIG. 14B, FIG. 14C, and FIG. 14D.

Figure 13A:
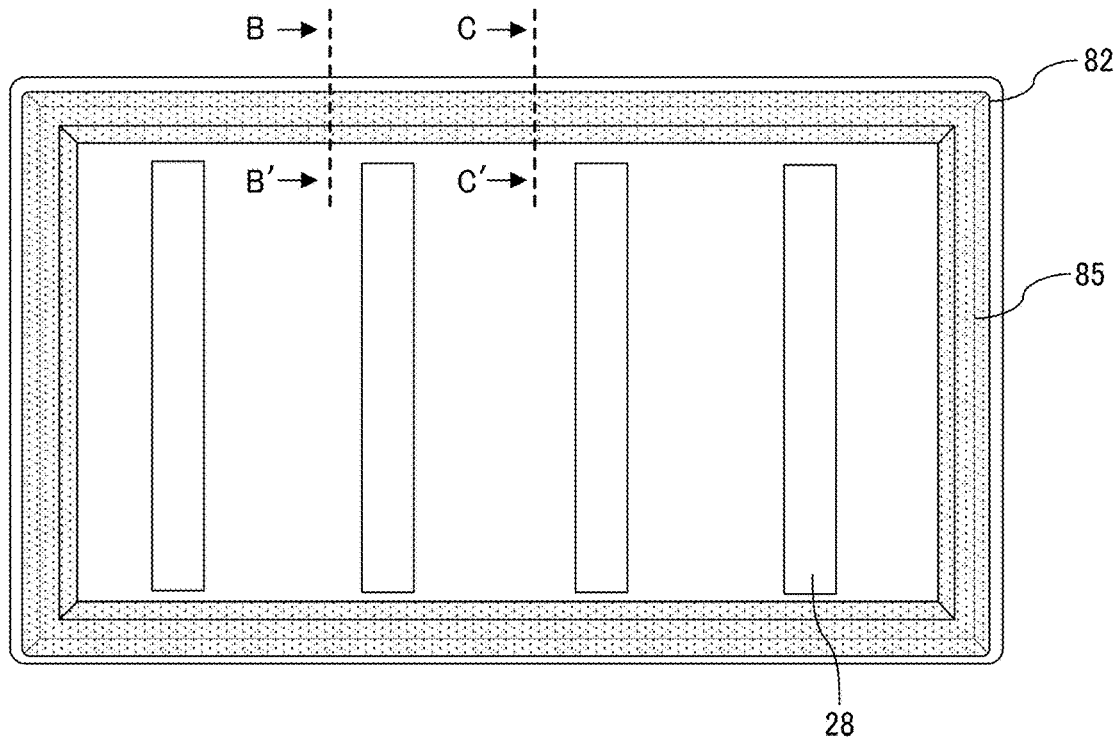
FIG. 13A and FIG. 13B are schematic plan views of the cover of FIG. 11A to which a seal is attached, according to an alternative embodiment of the present disclosure, and the seal is depicted transparently in FIG. 13B.
Figure 13B:
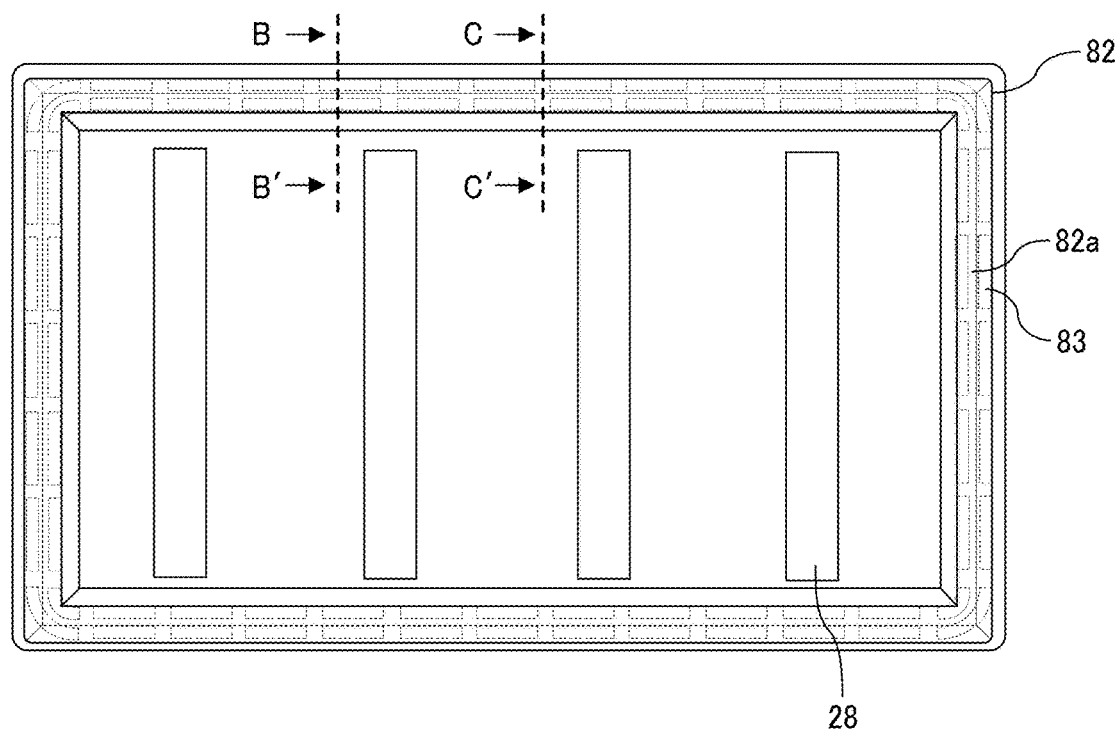

FIG. 13A and FIG. 13B are schematic plan views of the cover 82 of FIG. 11A when viewed from the outside of the casing 31, according to an alternative embodiment of the present disclosure.

In FIG. 13A, the seal 85 is illustrated and not depicted transparently. In FIG. 13B, the seal 85 is depicted transparently. What FIG. 13A depicts is equivalent to what FIG. 13B depicts just except that the way the seal 85 is illustrated is different between FIG. 13A and FIG. 13B.

Figure 13C:
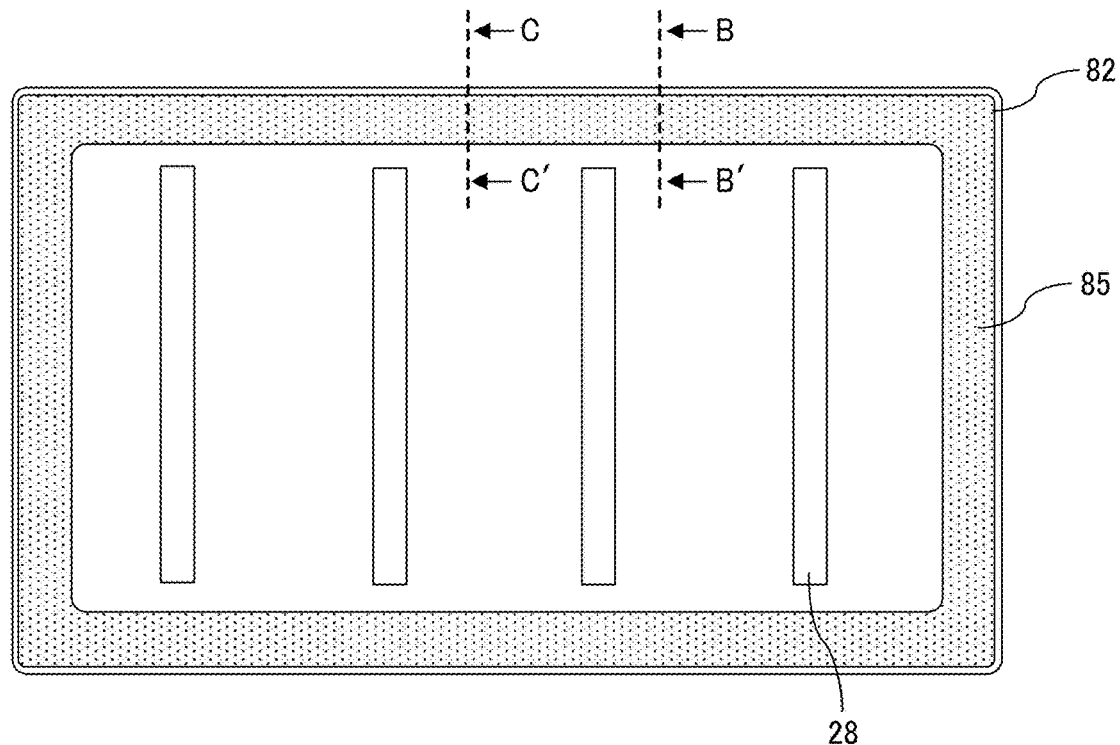
FIG. 13C and FIG. 13D are schematic plan views of the cover of FIG. 11A, a seal is attached to the other side of the cover in comparison to FIG. 11A, and the seal is depicted transparently in FIG. 13D.
Figure 13D:
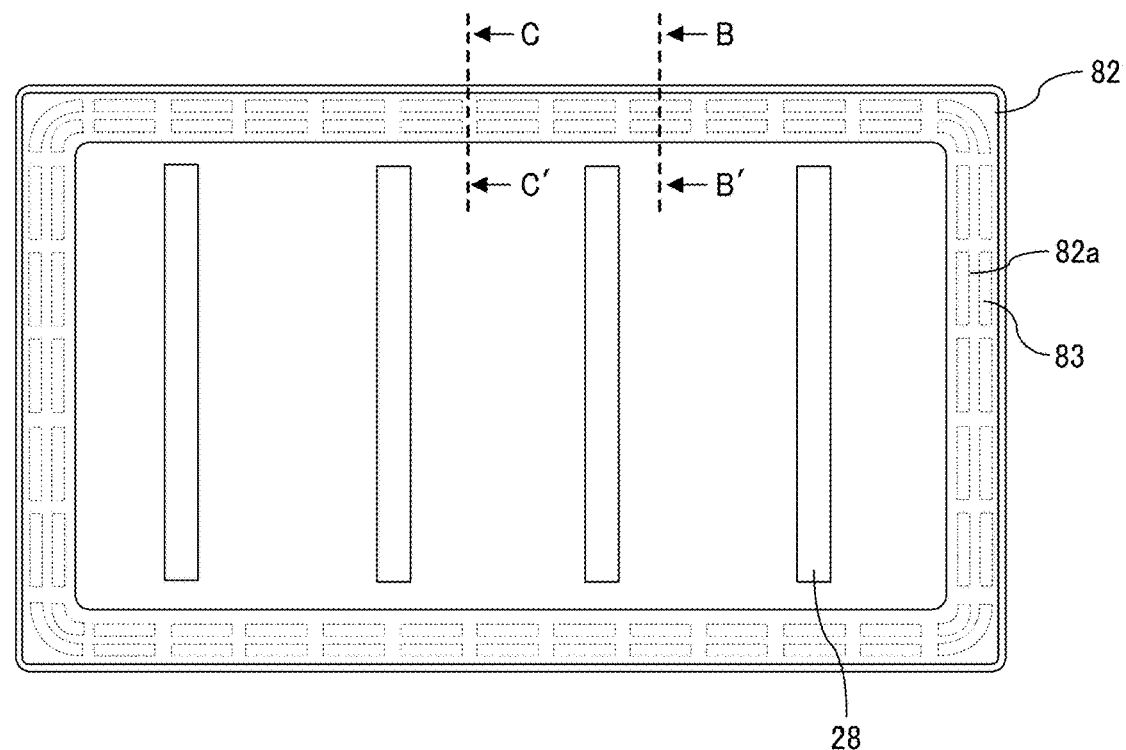

FIG. 13C and FIG. 13D are schematic plan views of the cover 82 of FIG. 11A when viewed from the inside of the casing 31, according to an alternative embodiment of the present disclosure.

In FIG. 13C, the seal 85 is illustrated and not depicted transparently. In FIG. 13C, the seal 85 is depicted transparently. What FIG. 13C depicts is equivalent to what FIG. 13D depicts just except that the way the seal 85 is illustrated is different between FIG. 13C and FIG. 13D.

Figure 14A:
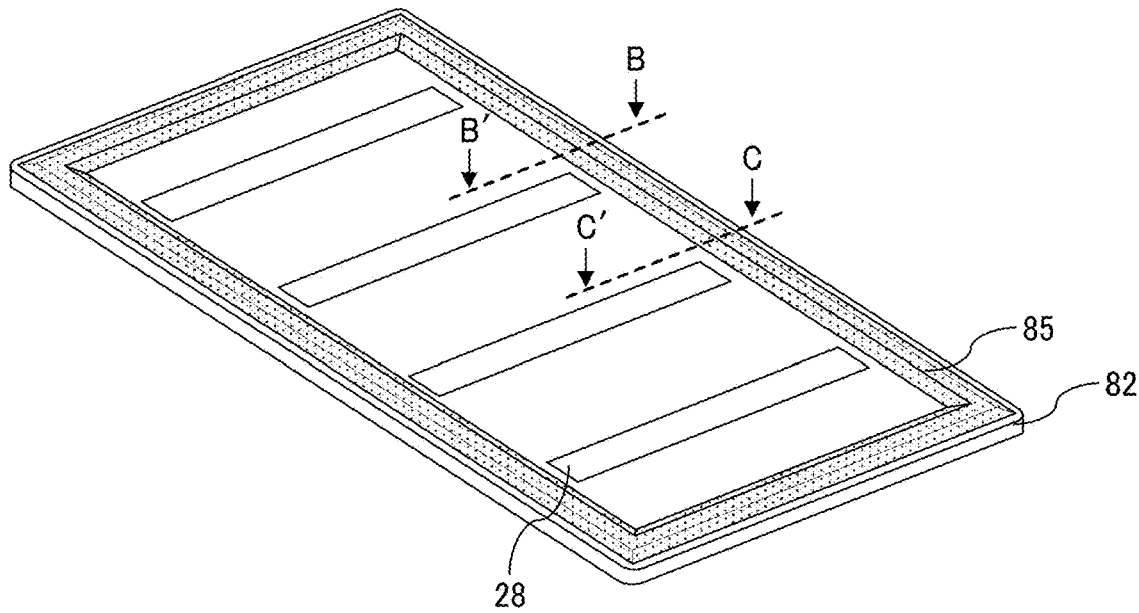
FIG. 14A is a schematic perspective view of the cover of FIG. 12A to which a seal is attached, according to an alternative embodiment of the present disclosure.
Figure 14B:
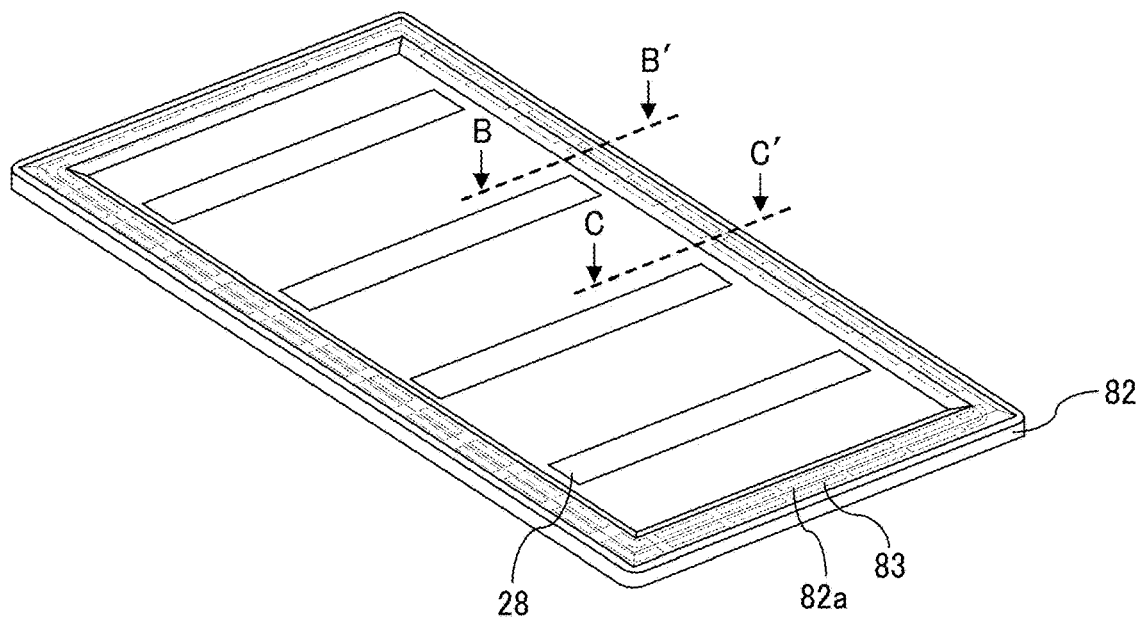
FIG. 14B is a schematic perspective view of the cover of FIG. 12A to which a seal is attached but the seal is depicted transparently, according to an alternative embodiment of the present disclosure.

FIG. 14A and FIG. 14B are schematic perspective views of the cover 82 of FIG. 12A when viewed from the outside of the casing 31, according to an alternative embodiment of the present disclosure.

In FIG. 14A, the seal 85 is illustrated and not depicted transparently.

In FIG. 14B, the seal 85 is depicted transparently.

What FIG. 14A depicts is equivalent to what FIG. 14B depicts just except that the way the seal 85 is illustrated is different between FIG. 14A and FIG. 14B. As illustrated in FIG. 14A, the seal 85 according to the present embodiment has a shape rising outward from the casing 31 further than the cover 82. Such an alternative embodiment of the present disclosure will be described later in detail with reference to some sectional views.

Figure 14C:
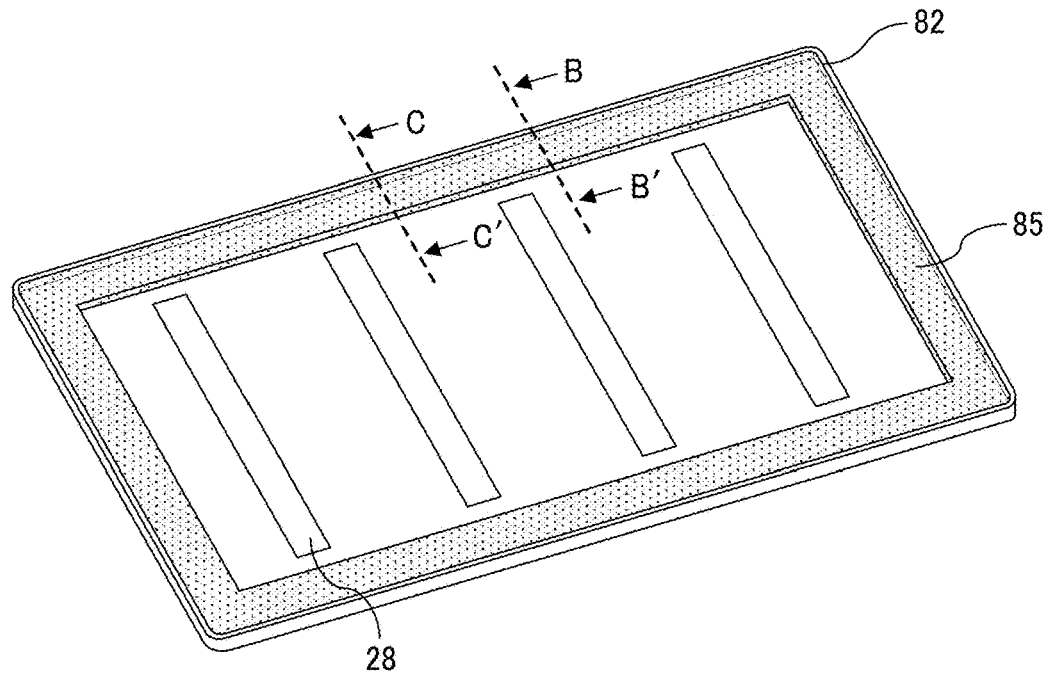
FIG. 14C and FIG. 14D are schematic perspective views of the cover of FIG. 12B to which a seal is attached, according to an alternative embodiment of the present disclosure, and the seal is depicted transparently in FIG. 14D.
Figure 14D:
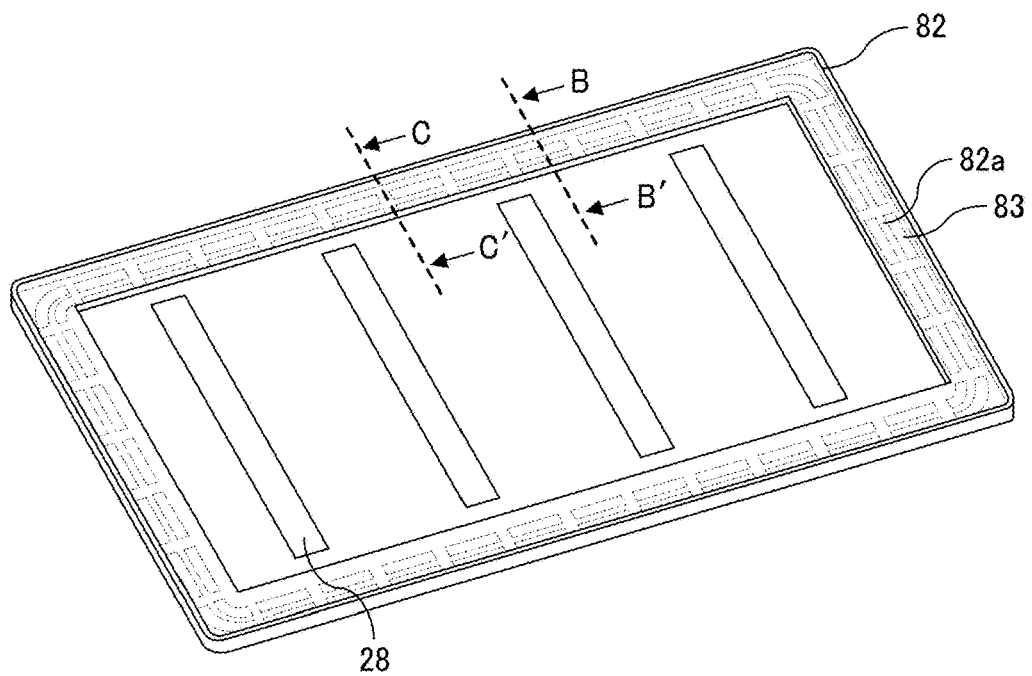

FIG. 14C and FIG. 14D are schematic perspective views of the cover 82 of FIG. 12B when viewed from the inside of the casing 31, according to an alternative embodiment of the present disclosure.

In FIG. 14C, the seal 85 is illustrated and not depicted transparently.

In FIG. 14D, the seal 85 is depicted transparently.

What FIG. 14C depicts is equivalent to what FIG. 14D depicts just except that the way the seal 85 is illustrated is different between FIG. 14C and FIG. 14D. As illustrated in FIG. 14C, the seal 85 according to the present embodiment has a flat shape in a direction toward the inside of the casing 31. Such an alternative embodiment of the present disclosure will be described later in detail with reference to some sectional views.

Figure 15A:
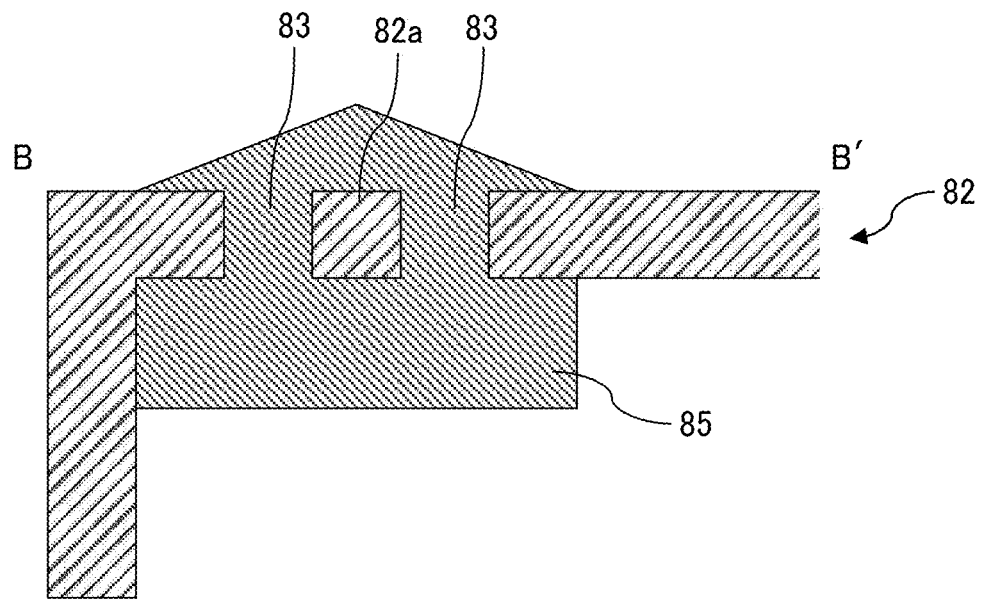
FIG. 15A is a schematic B-B' sectional view of the cover illustrated in FIG. 13A, FIG. 13B, FIG. 13C, FIG. 13D, FIG. 14A, FIG. 14B, FIG. 14C, and FIG. 14D, according to an alternative embodiment of the present disclosure.
Figure 15B:
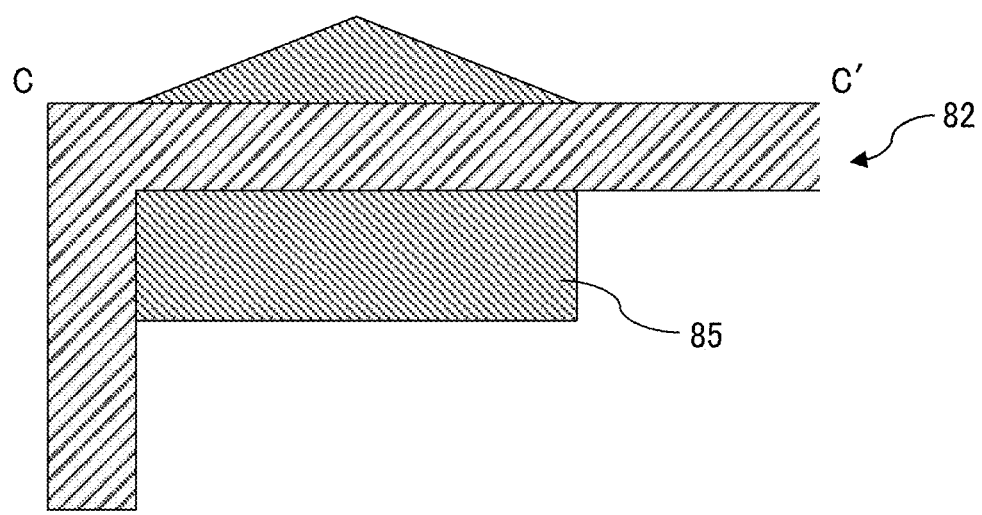
FIG. 15B is a schematic C-C' sectional view of the cover illustrated in FIG. 13A, FIG. 13B, FIG. 13C, FIG. 13D, FIG. 14A, FIG. 14B, FIG. 14C, and FIG. 14D, according to an alternative embodiment of the present disclosure.

FIG. 15A is a schematic B-B' sectional view of the cover 82 illustrated in FIG. 13A, FIG. 13B, FIG. 13C, FIG. 13D, FIG. 14A, FIG. 14B, FIG. 14C, and FIG. 14D, according to an alternative embodiment of the present disclosure. FIG. 15B is a schematic C-C' sectional view of the cover 82 illustrated in FIG. 13A, FIG. 13B, FIG. 13C, FIG. 13D, FIG. 14A, FIG. 14B, FIG. 14C, and FIG. 14D, according to an alternative embodiment of the present disclosure.

As illustrated in FIG. 15A, the seal 85 is arranged so as to fill the multiple openings 83.

As illustrated in FIG. 15A, the seal 85 according to the present embodiment is integrated with the cover 82 over one surface on the front side and the other surface on the rear side through the multiple openings 83. Due to such a configuration, the multiple hooks 82a are contained in the seal 85 in the open and close cross section, and the seal 85 can be prevented from peeling off.

As described above with reference to FIG. 15A, the seal 85 according to the present embodiment has a shape rising outward from the casing 31 further than the cover 82. In the present embodiment described with reference to FIG. 15A, the upper portion of the seal 85 is formed in a triangular shape. However, no limitation is intended thereby. As will be described later, for example, the upper portion of the seal 85 may be curved.

As illustrated in FIG. 13A, FIG. 13B, FIG. 13C, FIG. 13D, FIG. 14A, FIG. 14B, FIG. 14C, FIG. 14D, FIG. 15A, and FIG. 15B, the seal 85 according to the present alternative embodiment is continuously and integrally molded when viewed from the front on one side of the cover 82, and is continuously and integrally molded when viewed from the rear on the other side of the cover 82. In the present embodiment, the seal 85 is continuously arranged on the four sides of the cover 82. Due to such a configuration as described above, the seal 85 can further be prevented from peeling off when the cover 82 is opened or closed.

In the above embodiments of the present disclosure, as illustrated in FIG. 5A, FIG. 5B, FIG. 7A, FIG. 7B, FIG. 8A, FIG. 8B, and FIG. 8C, the cover 32 is provided with a trench in which the seal 35 is to be arranged. However, as described above with reference to FIG. 15A and FIG. 15B according to the present alternative embodiment, a trench is not always necessary and may be omitted.

The planar shape of the cover in the direction of the plane is not limited to any particular shape. However, the planar shape of the cover in the direction of the plane may have, for example, a rectangular shape as in the above embodiments of the present disclosure or the present alternative embodiments of the present disclosure (see, for example, FIG. 11A and FIG. 11B).

As described above, it is desired that a plurality of hooks be arranged, and the positions at which the multiple hooks are arranged can be selected as desired and any desired number of the multiple hooks can be arranged. As in the above embodiments described with reference to, for example, FIG. 4, FIG. 8A, FIG. 8B, and FIG. 8C, the multiple hooks 32a are arranged at two sides of the cover 32 facing each other in the plan view. As described above, it is desired that a plurality of hooks be arranged at two sides of a cover facing each other in the plan view. Due to such a configuration, the seal can evenly be prevented from being separated from the cover.

By contrast, in the present embodiment as described above with reference to FIG. 11A and FIG. 11B, the multiple hooks 82a are arranged at all the four sides of the cover 82 in the plan view. As described above, it is desired that a plurality of hooks such as the multiple hooks 82a be arranged at all the sides of a cover such as the cover 82 in the plan view. As a result, the seal can further be prevented from peeling off, and the seal can evenly be prevented from being separated from the cover.

Preferably, to which one of the sides of the cover in a plan view the multiple hooks are to be arranged is designed in view of, for example, to what degree the seal is prevented from peeling off, how easily the cover could be manufactured, and the processability of the cover when the cover is reused or recycled. For example, when a plurality of hooks are arranged at two sides of the cover facing each other in the plan view, it is advantageous in how easily the cover could be manufactured and in the processability of the cover when the cover is reused or recycled. For example, when a plurality of hooks are arranged at all the four sides of the cover facing each other in the plan view, the seal can further be prevented from peeling off.

In the present embodiment as described above with reference to FIG. 11A and FIG. 11B, the multiple hooks 82a are arranged at all the four corners of the cover 82 in the plan view. Due to such a configuration, the seal 85 can be prevented from peeling off from the corners of the cover 82 in the plan view. In the present embodiment, each one of the multiple hooks 82a is interposed between a pair of the multiple openings 83 of the cover 82. Due to such a configuration, the multiple hooks 82a can be arranged at all the four corners of the cover 82 in the plan view.

In a similar manner to the above embodiments of the present disclosure, also in the present alternative embodiment of the present disclosure, a method of molding the seal 85 is not limited, and any desired method can be selected. For example, when the seal 85 is molded by injection molding in the present embodiment, the seal 85 can easily integrally be molded with the cover 82 over one surface on the front side and the other surface on the rear side through the multiple openings 83. Also in the present alternative embodiment of the present disclosure, the material of the seal 85 may be heated and poured for moldings using, for example, a melter.

Cases in which the cover 82 is attached to the casing 31 according to a further alternative embodiment of the present disclosure are described below.

Figure 16:
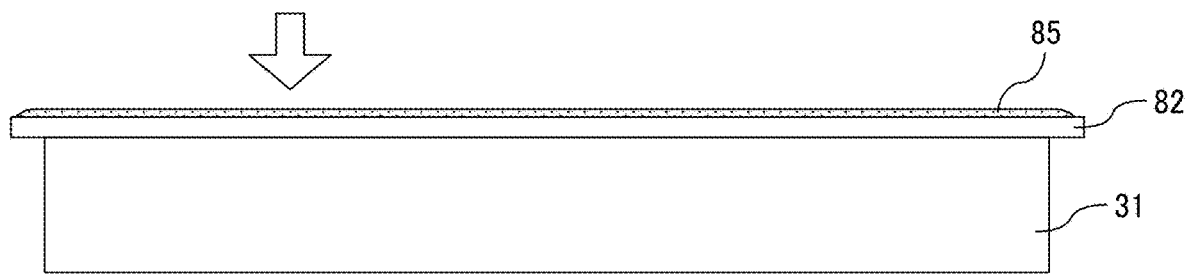
FIG. 16 is a schematic side view of a cover closed onto a casing, according to a further alternative embodiment of the present disclosure.

FIG. 16 is a schematic side view of the casing 31 to which the cover 82 is attached, according to another alternative embodiment of the present disclosure.

Figure 17:
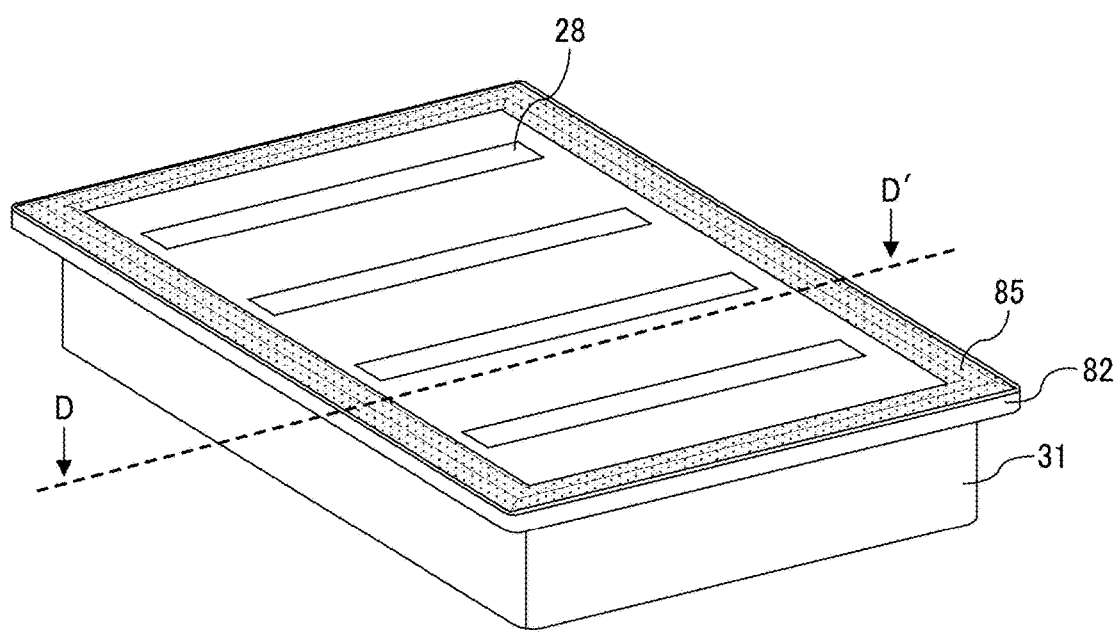
FIG. 17 is a schematic perspective view of the cover and the casing of FIG. 16, according to a further alternative embodiment of the present disclosure.

FIG. 17 is a schematic perspective view of the casing 31 to which the cover 82 is attached, according to another alternative embodiment of the present disclosure.

A hollow arrow in FIG. 16 indicates the direction in which the cover 82 is assembled, and the cover 82 is assembled to the side of the casing 31 with aperture from above. Such a direction in which the cover 82 is assembled can also be referred to as a direction in which the cover 82 is closed. The reverse direction to the above direction in which the cover 82 is assembled can be referred to as a direction in which the cover 82 is opened.

Figure 18:
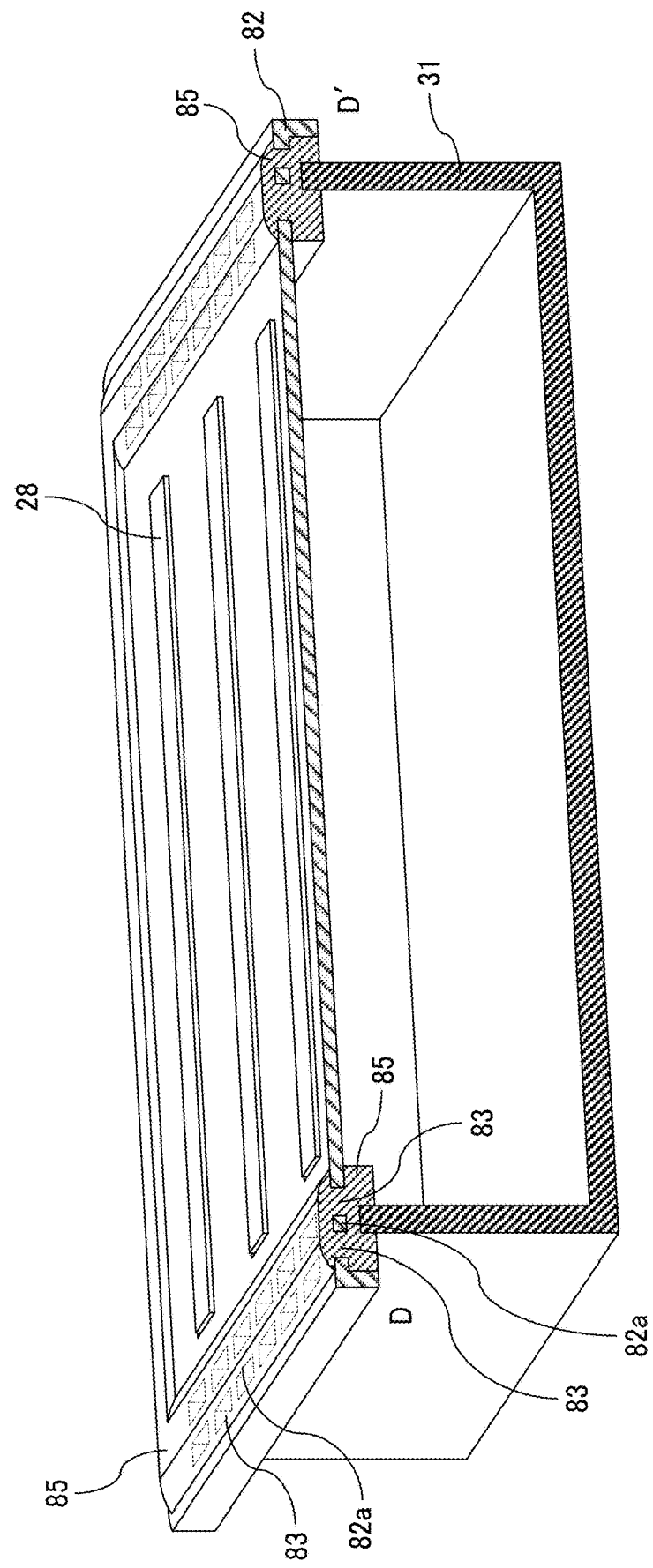
FIG. 18 is a schematic perspective view and a schematic D-D' sectional view of the cover and the casing of FIG. 17, according to a further alternative embodiment of the present disclosure.

FIG. 18 is a D-D' sectional view of the cover 82 and the casing 31 of FIG. 17, and is a schematic perspective view of the cover 82 and the casing 31 of FIG. 17, according to another alternative embodiment of the present disclosure.

In FIG. 18, the seal 85 is viewably depicted only at the cross section and is depicted transparently at the other portions. For this reason, in the perspective view of FIG. 18, the multiple hooks 82a and the multiple openings 83 are indicated by broken lines. The cross section in FIG. 18 is equivalent to an open and close cross section taken in a direction the cover 82 is opened and closed.

As illustrated in FIG. 18, it is assumed that the cover 82 is closed and fixed to the casing 31 when the casing 31 contacts or is engaged in the seal 85. Due to such a configuration, hermetic sealing with greater reliability can be achieved with no gap. In the present embodiment described with reference to FIG. 18, the cover 82 is fixed to the casing 31 as the casing 31 is engaged in the seal 85.

As illustrated in the sectional view of FIG. 18, the cover 82 according to the present embodiment is also at least partially contained in the seal 85 in the open and close cross section. As illustrated in FIG. 18, the multiple hooks 82a are included in the seal 85 in the open and close cross section. Each one of the hooks 82a is formed by a pair of openings 83. This configuration or structure will also be described later in detail with reference to FIG. 20 and FIG. 21. The multiple hooks 32a according to the above embodiment of the present disclosure may be applied to the present further alternative embodiment of the present disclosure.

Figure 19:
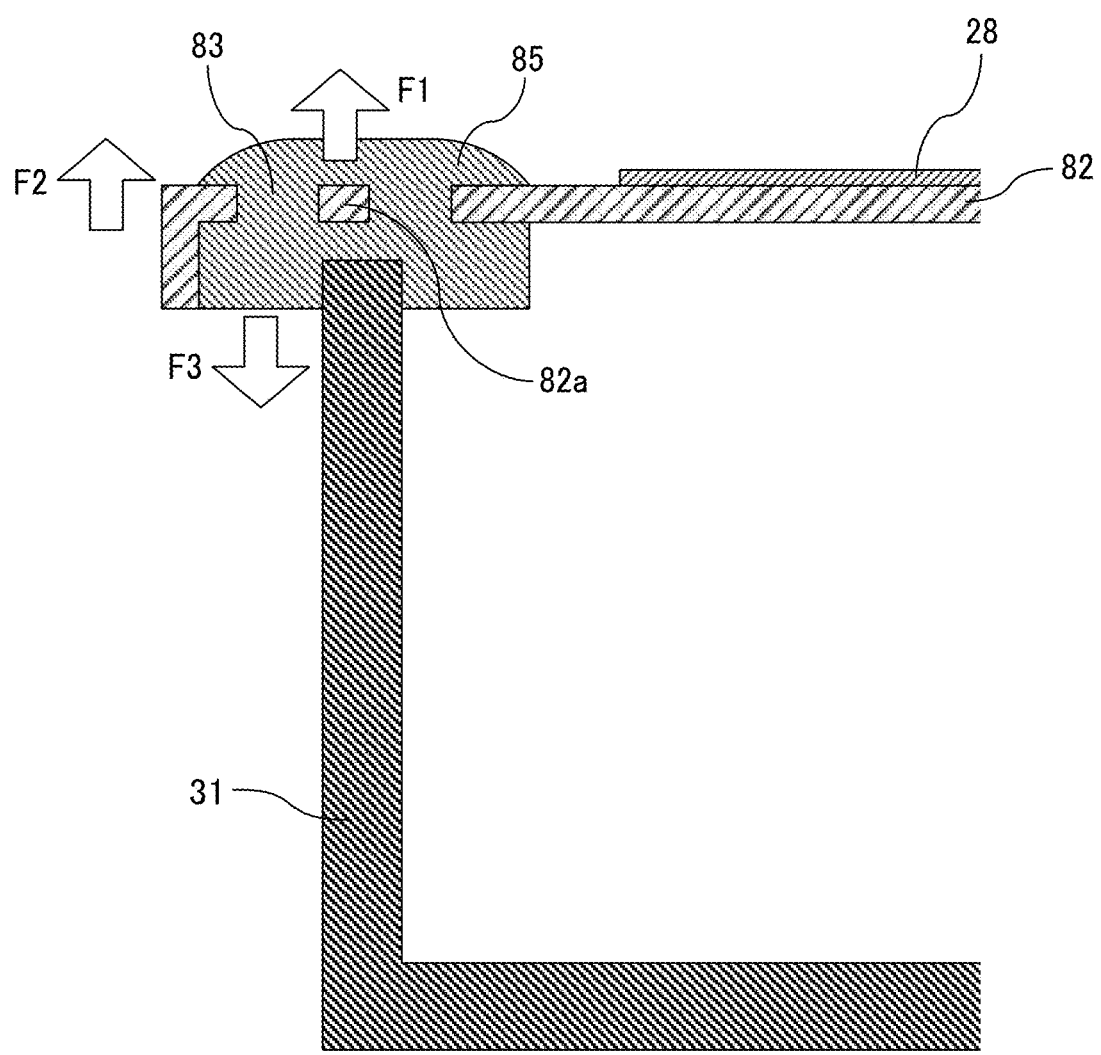
FIG. 19 is a partial schematic D-D' sectional view of the cover and the casing of FIG. 17, according to a further alternative embodiment of the present disclosure.

FIG. 19 is a schematic D-D' sectional view of the cover 82 and the casing 31 of FIG. 17, and is a schematic sectional view of the cover 82 and the casing 31 of FIG. 18, according to another alternative embodiment of the present disclosure.

In FIG. 19, several kinds of stress that are applied to the seal 85 when the cover 82 is detached from the casing 31 are schematically indicated by arrows F1, F2, and F3. More specifically, F1 indicates the tension caused by the hook 82a, and F2 indicates the adhesive strength between the cover 82 and the seal 85. Further, F3 indicates the tension from the casing 31. The action of detaching the cover 82 from the casing 31 may be referred to as the action of opening the cover 82.

If the adhesive strength F2 between the cover 82 and the seal 85 is sufficiently strong, it is unlikely that the seal 85 is taken by the casing 31 when the cover 82 is detached from the casing 31. In other words, if the adhesive strength F2 between the cover 82 and the seal 85 is sufficiently strong, it is more likely that the seal 85 remains on the cover 82. However, if the adhesive strength F2 between the cover 82 and the seal 85 is designed to increase, the selectivity in regard to, for example, the shape of the cover 82 and the materials for the seal 85 tends to decrease. When the seal 85 that increases the adhesive strength F2 is used, the adhesive strength with the casing 31 also increases and it may become difficult to detach the cover 82 from the casing 31. For example, due to deterioration over time, there are some cases in which the seal 85 fixedly remains on the casing 31 in an unintentional manner. In such cases, the seal 85 tends to remain on the casing 31 when the cover 82 is detached from the casing 31. Moreover, the seal 85 may be damaged when the cover 82 is to be removed from the casing 31, and the recycling may become difficult.

In order to deal with such a situation, the multiple hooks 82*a* are arranged in the present embodiment. Due to such a configuration, the tension F1 is caused by the multiple hooks 82*a*, and it is more likely that the seal 82 remains on the cover 85. Due to such configurations as described above, it is not necessary to increase the adhesive strength F2 between the cover 82 and the seal 85 excessively, and the selectivity in regard to, for example, the shape of the cover 82 and the materials for the seal 85 can be prevented from decreasing. The seal 85 can be prevented from being damaged when the cover 82 is to be removed from the casing 31, and the recycling becomes easy.

The positions of the multiple hooks 82*a* can be appropriately changed, and preferably, the hooks 82*a* are located near, for example, a contact point where the casing 31 contacts the seal 85. In the present further alternative embodiment described with reference to FIG. 19, the hooks 82*a* are located near a contact point where the casing 31 contacts the seal 85.

Figure 20:
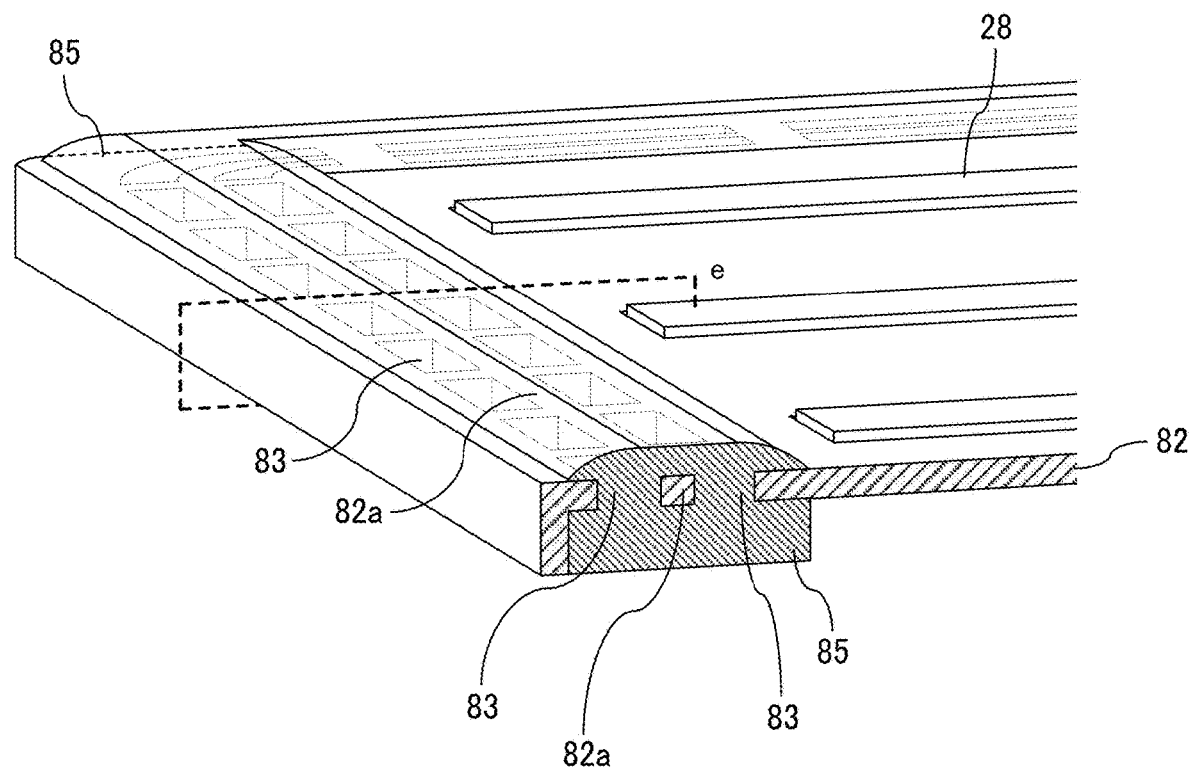
FIG. 20 is a schematic perspective view and a schematic D-D' sectional view of the cover and the casing of FIG. 17 where the cover is opened, according to a further alternative embodiment of the present disclosure.

FIG. 20 is a diagram illustrating the cover 82 detached from the casing 31, according to another alternative embodiment of the present disclosure.

FIG. 20 is a schematic D-D' sectional view of the cover 82 and the casing 31 of FIG. 17, and is a schematic perspective view of the cover 82 and the casing 31 in a similar manner to FIG. 17, according to another alternative embodiment of the present disclosure. In other words, FIG. 20 is a diagram illustrating a portion of the cover 82 of FIG. 18 detached from the casing 31, according to another alternative embodiment of the present disclosure.

Figure 21:
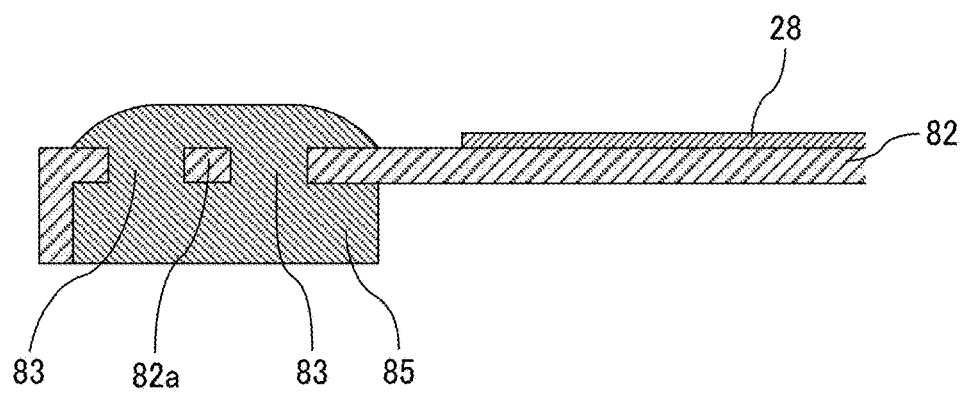
FIG. 21 is a partial schematic D-D' sectional view of the cover and the casing of FIG. 17 where the cover is opened, according to a further alternative embodiment of the present disclosure.

FIG. 21 is a cross section e as illustrated in FIG. 20. Each one of the sectional views illustrated in FIG. 20 and FIG. 21 serves as an open and close cross section taken in a direction the cover 82 is opened and closed.

As illustrated in FIG. 21, the multiple hooks 82*a* are included in the seal 85 in the open and close cross section. Each one of the hooks 82*a* is formed by the pair of openings 83. In such a cross section, it can be said that the cross-sectional areas of the multiple hooks 82*a* are contained in the cross-sectional area of the seal 85. Due to such a configuration, the above-mentioned advantageous effects can be achieved.

Some alternative embodiments of the present disclosure are described below. Redundant descriptions of the same matters as those described above may be omitted below.

Figure 22A:
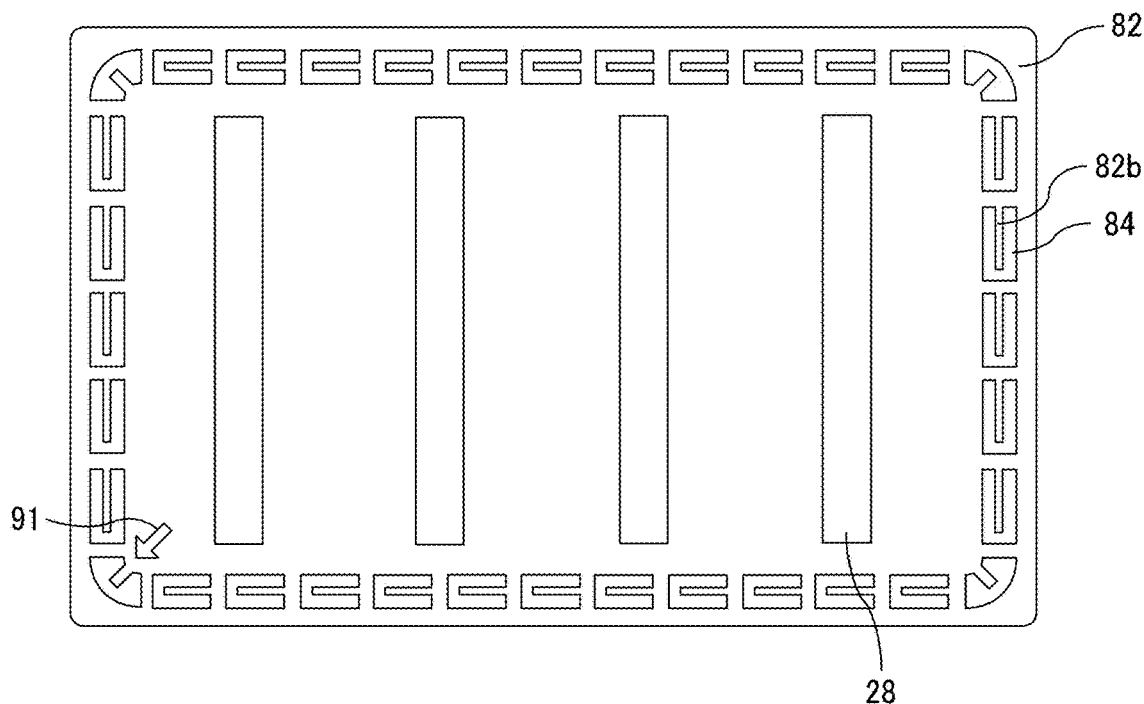
FIG. 22A is a schematic plan view of a cover when viewed from the outside of a casing, according to another further alternative embodiment of the present disclosure.

FIG. 22A is a schematic plan view of the cover 82 when viewed from the outside of the casing 31, according to another further alternative embodiment of the present disclosure.

Figure 22B:
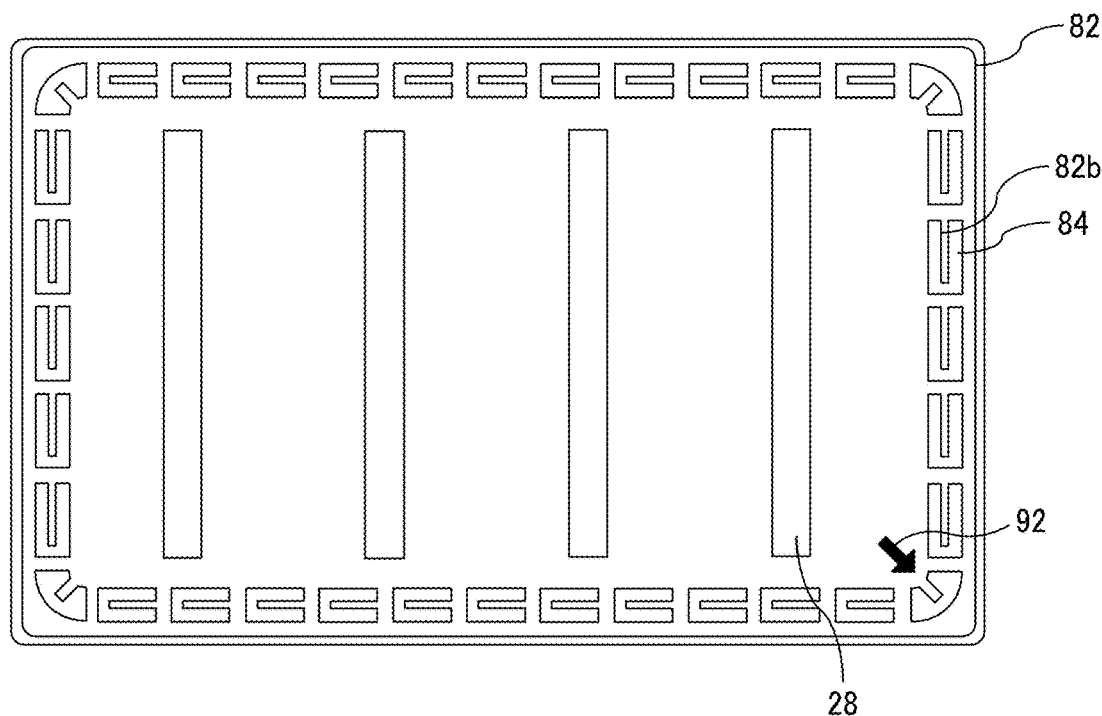
FIG. 22B is a schematic plan view of a cover when viewed from the inside of a casing, according to another further alternative embodiment of the present disclosure.

FIG. 22B is a schematic plan view of the cover 82 when viewed from the inside of the casing 31, according to another further alternative embodiment of the present disclosure.

Figure 23A:
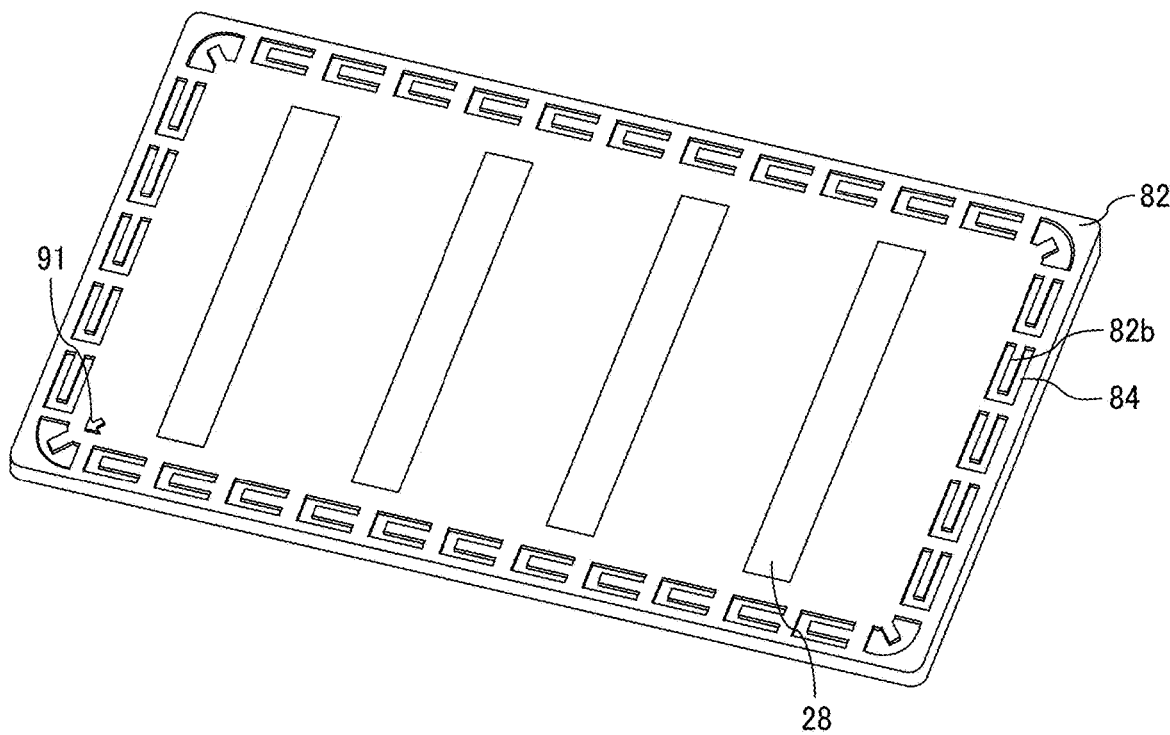
FIG. 23A is a schematic perspective view of the cover of FIG. 22A according to another further alternative embodiment of the present disclosure.

FIG. 23A is a schematic perspective view of the cover 82 when viewed from the outside of the casing 31, according to another further alternative embodiment of the present disclosure.

Figure 23B:
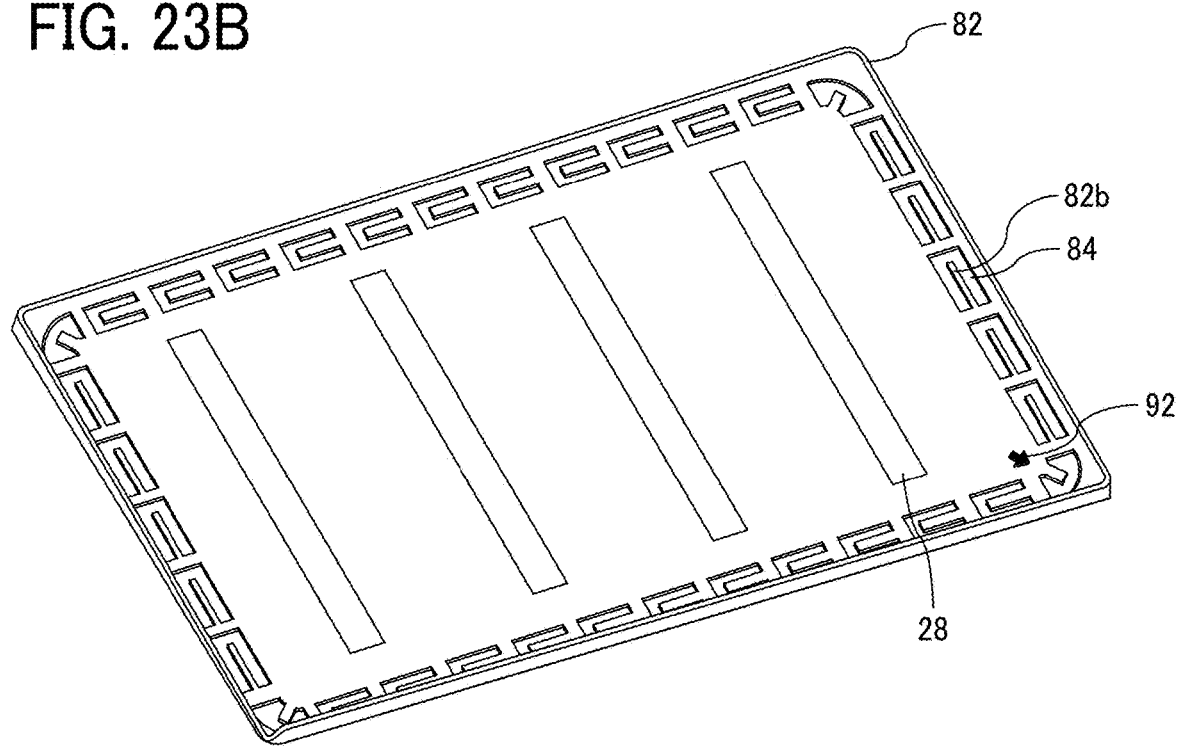
FIG. 23B is a schematic perspective view of the cover of FIG. 22B according to another further alternative embodiment of the present disclosure.

FIG. 23B is a schematic perspective view of the cover 82 when viewed from the inside of the casing 31, according to another further alternative embodiment of the present disclosure.

The cover 82 according to the present embodiment has a plurality of hooks 82*b* and a plurality of openings 84. Each one of the multiple hooks 82*b* according to the present embodiment is surrounded by one of the multiple openings 84 of the cover 82, and extends in a direction different from the direction in which the cover 82 is opened or closed. For example, each one of the multiple openings 84 according to the present embodiment has a U-shape in a plan view, and each portion that is surrounded by each one of the multiple openings 84 serves as each one of the hooks 82*b*.

Accordingly, one end of each one of the multiple hooks 82*b* according to the present embodiment is coupled to the cover 82, and the other end of each one of the multiple hooks 82*b* according to the present embodiment is separated from the cover 82. As one end of each one of the multiple hooks 82*b* is separated from the cover 82 as described above in the present further alternative embodiment, for example, the degree of processability when the seal 85 is removed from the cover 82 in a factory can be increased. According to the present further alternative embodiment, it is not always necessary to cut the seal 85 when the seal 85 is removed from the cover 82. How the seal 85 is removed from the cover 82 is not limited to any particular embodiment, but may be classified into, for example, the case of recycling, the case of disassembling, and cases in which the seal 85 is to be replaced with a different seal.

As illustrated in FIG. 11A, FIG. 11B, FIG. 12A, FIG. 12B, FIG. 13A, FIG. 13B, FIG. 14A, FIG. 14B, FIG. 15A, and FIG. 15B, both ends of each one of the multiple hooks 82*a* according to the present embodiment contact the cover 82.

Each one of the multiple hooks 82*b* according to the present embodiment extends in a direction different from the direction in which the cover 82 is opened or closed. Due to such a configuration, the seal 85 can be prevented from peeling off when the cover 82 is to be removed from the casing 31. For example, the seal 85 can be removed by sliding the seal 85 in a direction the multiple hooks 82*b* extend, and the degree of processability can be increased.

Figure 24A:
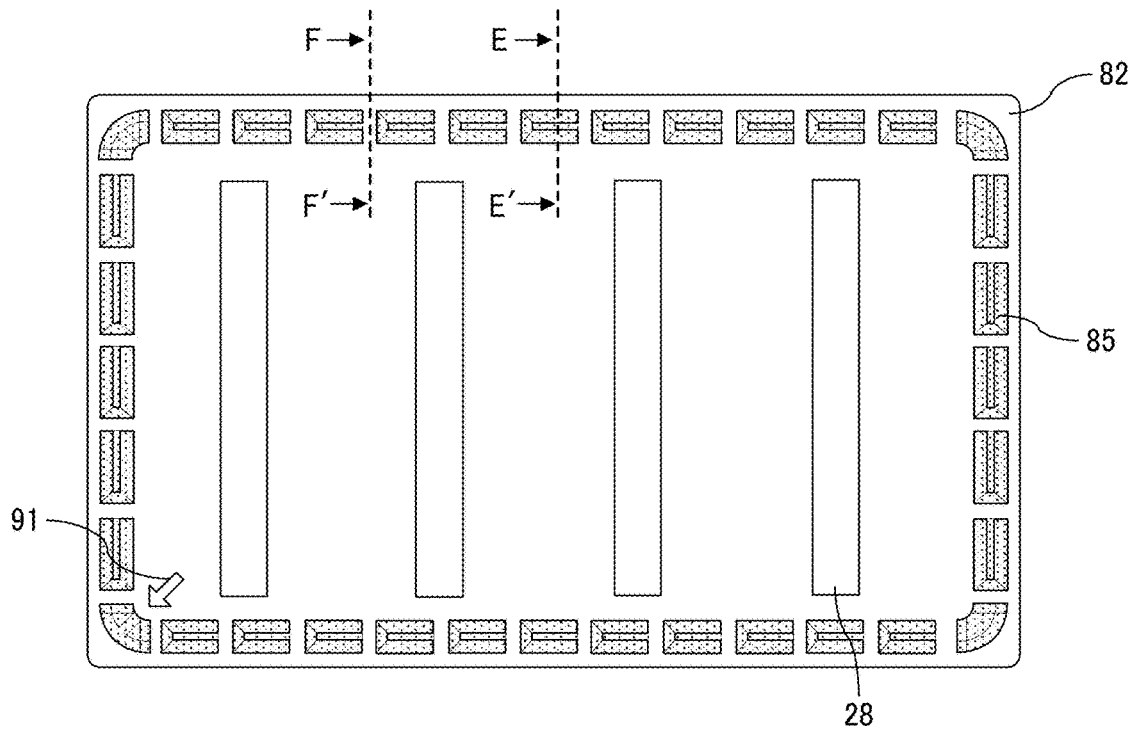
FIG. 24A is a schematic plan view of the cover of FIG. 22A to which a seal is attached, according to another further alternative embodiment of the present disclosure.

FIG. 24A is a schematic plan view of the cover 82 of FIG. 22A to which the seal 85 is attached when viewed from the outside of the casing 31, according to another further alternative embodiment of the present disclosure.

Figure 24B:
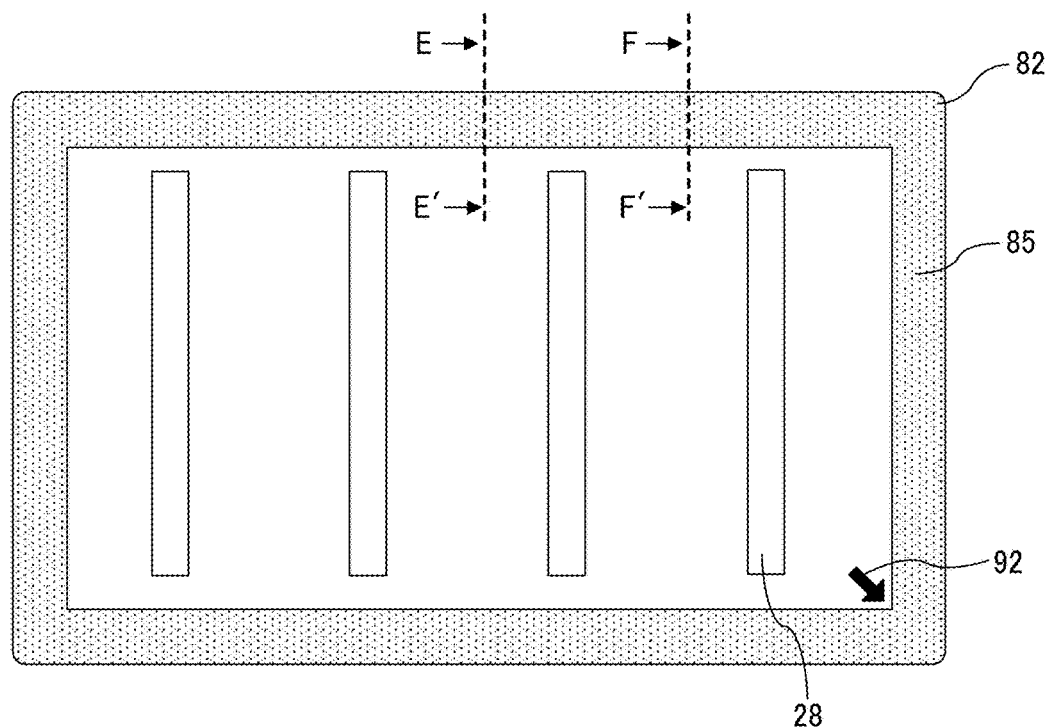
FIG. 24B is a schematic plan view of the cover of FIG. 22B to which a seal is attached, according to another further alternative embodiment of the present disclosure.

FIG. 24B is a schematic plan view of the cover 82 of FIG. 22B to which the seal 85 is attached when viewed from the inside of the casing 31, according to another further alternative embodiment of the present disclosure.

In the following description of the present disclosure, the outer surface of the cover 82 facing the outside of the casing 31 may be referred to as the front side, and such a front side is illustrated in FIG. 24A. By contrast, the inner surface of the cover 82 facing the inside of the casing 31 may be referred to as the rear side, and such a rear side is illustrated in FIG. 24B.

Figure 25A:
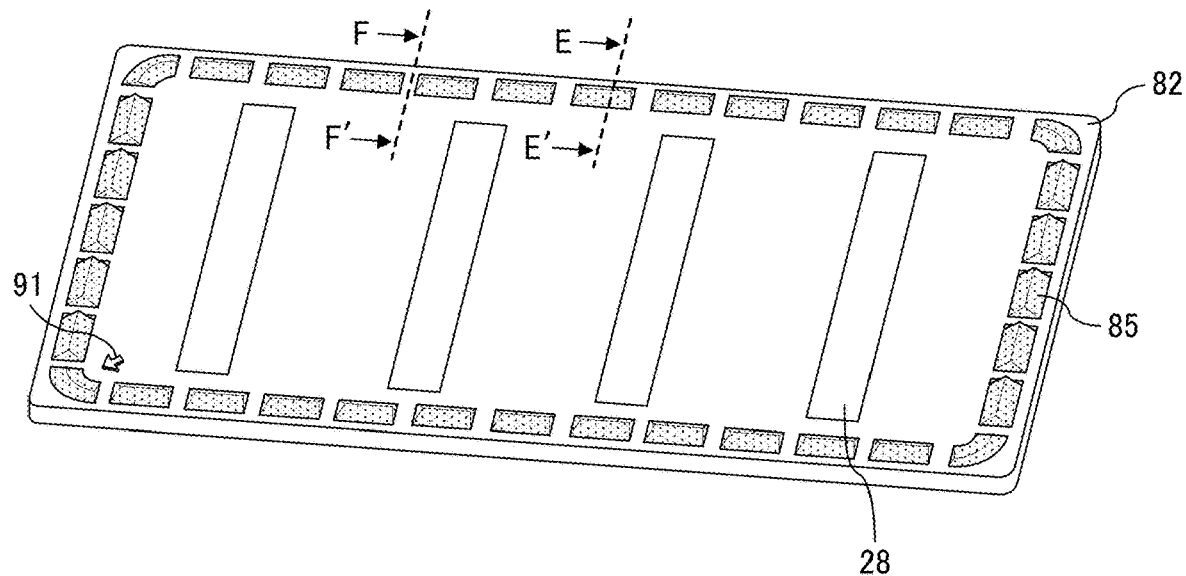
FIG. 25A is a schematic perspective view of the cover of FIG. 22A to which a seal is attached, according to another further alternative embodiment of the present disclosure.

FIG. 25A is a schematic perspective view of the cover 82 of FIG. 22A to which the seal 85 is attached when viewed from the outside of the casing 31, according to another further alternative embodiment of the present disclosure.

Figure 25B:
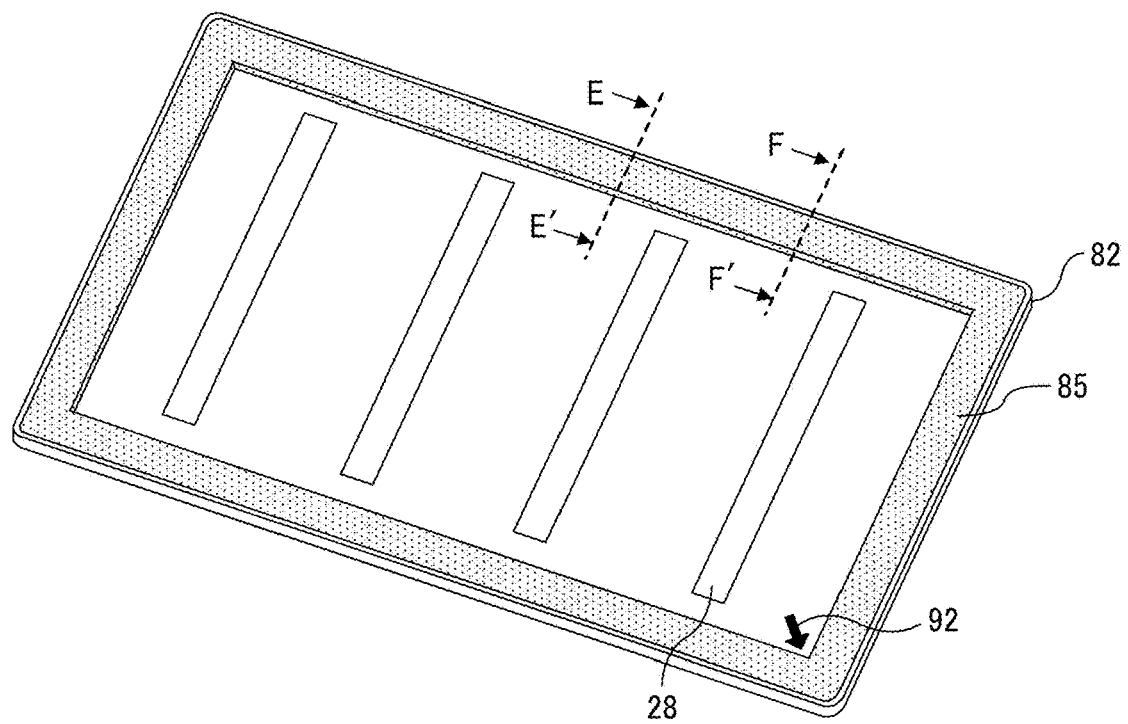
FIG. 25B is a schematic perspective view of the cover of FIG. 22B to which a seal is attached, according to another further alternative embodiment of the present disclosure.

FIG. 25B is a schematic perspective view of the cover 82 of FIG. 22B to which the seal 85 is attached when viewed from the inside of the casing 31, according to another further alternative embodiment of the present disclosure.

According to the present further alternative embodiment described above with reference to FIG. 24A and FIG. 25A, the seal 85 appears to be discontinuous when viewed from the front side of the cover 82. In other words, the seal 85 appears to be discontinuous and not integrated when viewed from the front side of the cover 82. Due to such a configuration, the seal 85 can easily be removed from the cover 82. By contrast, according to the present further alternative embodiment described above with reference to FIG. 24B and FIG. 25B, the seal 85 is continuously and integrally molded when viewed from the rear side of the cover 82. Due to such a configuration, the seal 85 can be prevented from peeling off.

In other words, the seal 85 according to the present embodiment is not continuously molded when viewed from the front on one side of the cover 82, and is continuously and integrally molded when viewed from the rear on the other side of the cover 82. Due to such a configuration, the seal 85 can be prevented from being detached from the cover 82 when the cover 82 is opened or closed. Furthermore, the seal 85 can be easily removed when the seal 85 is to be removed from the cover 82 to, for example, reuse or recycle the cover, and the degree of processability can be increased. According to the present further alternative embodiment of the present disclosure, both advantageous effects can be achieved.

Figure 26A:
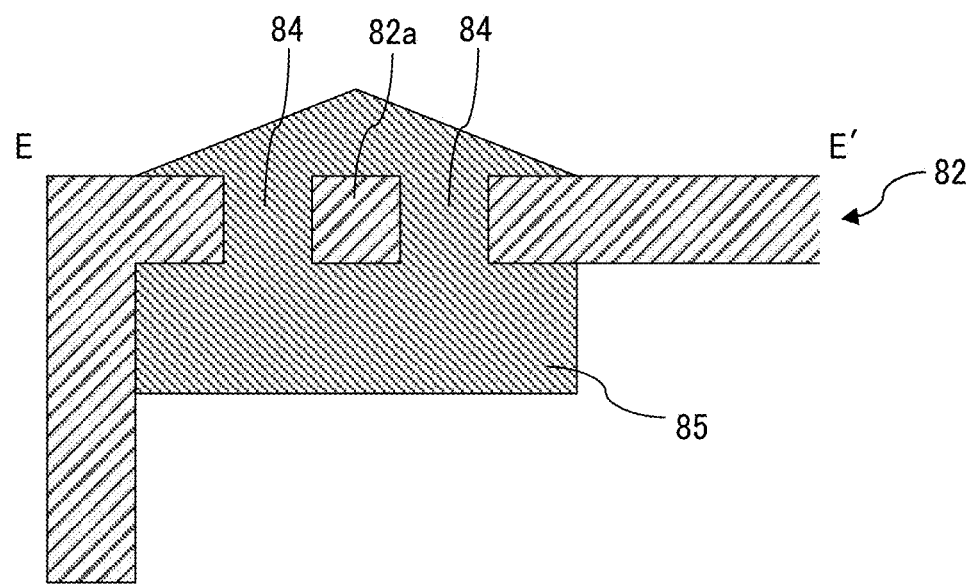
FIG. 26A is a schematic E-E' sectional view of the cover of FIG. 24A, FIG. 24B, FIG. 25A, and FIG. 25B according to another further alternative embodiment of the present disclosure.

FIG. 26A is a schematic E-E' sectional view of the cover 82 of FIG. 24A, FIG. 24B. FIG. 25A, and FIG. 25B according to another further alternative embodiment of the present disclosure.

Figure 26B:
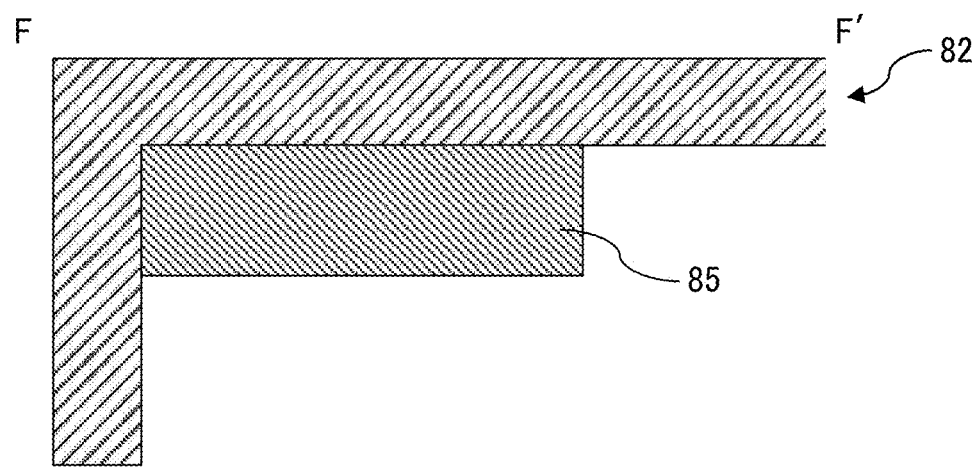
FIG. 26B is a schematic F-F' sectional view of the cover of FIG. 24A, FIG. 24B, FIG. 25A, and FIG. 25B according to another further alternative embodiment of the present disclosure.

FIG. 26B is a schematic F-F' sectional view of the cover 82 of FIG. 24A, FIG. 24B, FIG. 25A, and FIG. 25B according to another further alternative embodiment of the present disclosure.

As illustrated in FIG. 26A, the seal 85 is arranged so as to fill the multiple openings 84.

According to the present further alternative embodiment as described above, the seal 85 is not integrally molded and made discontinuous on the front side of the cover 82. As illustrated in FIG. 26B, the seal 85 is not arranged on the top face of the cover 82. In other words, in the present further alternative embodiment, the seal 85 is not integrally molded and made discontinuous on the front side of the cover 82.

In the present further alternative embodiment, it is desired that a first identifier 91 be arranged on the casing 31 or the cover 82 on which the seal 85, and the first identifier 91 indicates a starting point at which the cover 82 is removed from the casing 31. For example, the hollow arrows depicted in FIG. 22A, FIG. 23A, FIG. 24A, and FIG. 25A can serve as the first identifier 91. The first identifier 91 according to the present further alternative embodiment is arranged at a position visible from the outside of the casing 31. Due to the provision of the first identifier 91, a starting point at which the cover 82 is to be removed from the casing 31 can be identified, and the removal of the cover 82 from the casing 31 can be made easier. Accordingly, for example, the degree of processability of recycling can be increased.

In the present further alternative embodiment, it is desired that a second identifier 92 be arranged on the casing 31 or the cover 82 on which the seal 85, and the second identifier 92 indicates a starting point at which the cover 85 is removed from the casing 31 or the cover 82. For example, the arrows in black depicted in FIG. 22B, FIG. 23B, FIG. 24B, and FIG. 25B can serve as the second identifier 92. The second identifier 92 according to the present further alternative embodiment is arranged at a position visible when the cover 82 is removed. Due to the provision of the second identifier 92, a starting point at which the seal 85 is to be removed from the casing 31 or the cover 82 can be identified, and the removal of the seal 85 can be made easier. Accordingly, for example, the degree of processability of recycling can be increased.

The first identifier 91 and the second identifier 92 according to the present further alternative embodiment are not limited to symbols of arrow, and may be changed any desired kinds of symbol. For example, the first identifier 91 and the second identifier 92 according to the present further alternative embodiment may be signs, characters, or texts.

Some alternative embodiments of the present disclosure are described below.

In the above embodiments of the present disclosure, the opening on the top side of the casing is closed by the cover. However, no limitation is intended thereby. For example, the opening of the casing may be arranged in the downward direction of the casing rather than in the upward direction.

In the above embodiments of the present disclosure, the seal is attached to the cover. However, no limitation is intended thereby. In some embodiments of the present disclosure, a seal may be attached to a casing. The configuration or structure according to the above embodiments of the present disclosure may be applied to such an alternative embodiment of the present disclosure.

In the present disclosure, such an alternative embodiment is described with reference to the one drawing given below.

Figure 27:
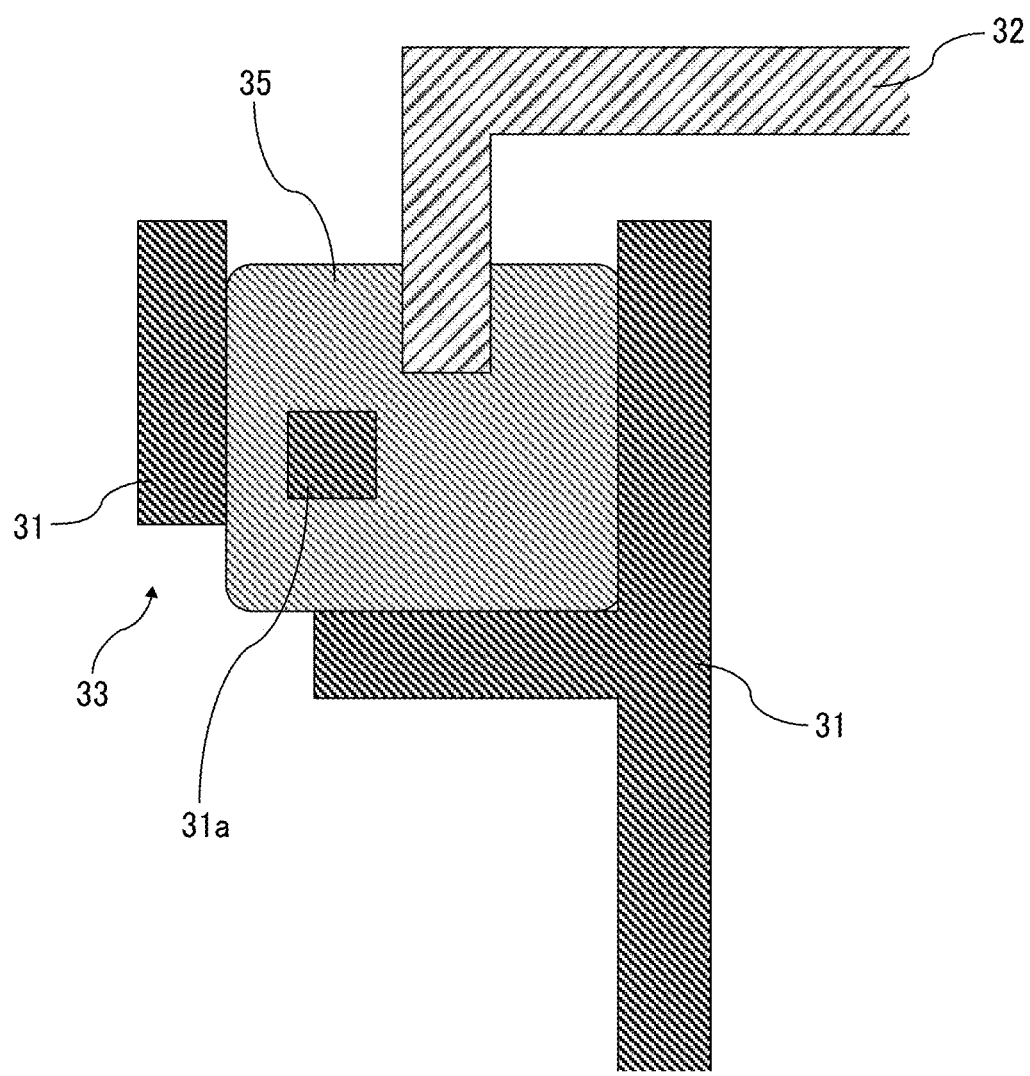
FIG. 27 is a schematic sectional view of a casing and a cover according to alternative embodiment of the present disclosure.

FIG. 27 is a schematic sectional view of the casing 31 and the cover 32 viewed in a direction the cover 32 is opened and closed, according to an alternative embodiment of the present disclosure, and is a diagram given in comparison to the above embodiments of the present disclosure described with reference to FIG. 5A.

Also in the present embodiment, the seal 35 is arranged between the casing 31 and the cover 32, and the seal 35 contacts the casing 31 and the cover 32 when the cover 32 is closed. In the present alternative embodiment, the casing 31 has a hook 31*a*, and the casing 31 according to the present embodiment is at least partially contained in the seal 35 in the cross sections taken in a direction the cover 32 is opened and closed. For example, the configuration or structure of the seal and the multiple hooks according to the embodiments described above may be applied to the present alternative embodiment.

According to the present alternative embodiment, the seal 35 can be prevented from peeling off from the casing 31 when the cover 32 is opened from the casing 31, and the seal 35 can be kept on the casing 31. Accordingly, the level of recycling processability can be increased.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A casing structure comprising:
   a casing having an opening;
   a cover that covers the opening of the casing, the cover openable and closable with respect to the casing; and a seal disposed between the casing and the cover, the seal contacting the casing and the cover when the cover is closed, wherein:

the casing or the cover includes at least one portion contained in the seal in a cross section taken in a direction the cover is opened or closed, and the casing or the cover has a hook that is at least partially contained in the seal in a cross section taken in the direction the cover is opened or closed.

2. A casing structure, comprising:

a casing having an opening;

a cover that covers the opening of the casing, the cover openable and closable with respect to the casing; and a seal disposed between the casing and the cover, the seal contacting the casing and the cover when the cover is closed, wherein:

the casing or the cover includes at least one portion contained in the seal in a cross section taken in a direction the cover is opened or closed, the casing or the cover includes a plurality of portions contained in the seal in a cross section taken in the direction the cover is opened or closed, the plurality of portions of the casing or the cover include the at least one portion of the casing or the cover.

3. The casing structure according to claim 1, wherein the hook extends in a direction different from a direction in which the cover is opened or closed.

4. The casing structure according to claim 1, wherein the cover includes a plurality of openings, and wherein the hook is interposed between a pair of the plurality of openings of the cover.

5. The casing structure according to claim 1, wherein the cover has a single opening, and wherein the hook is surrounded by the single opening of the cover, and extends in a direction different from a direction in which the cover is opened or closed.

6. The casing structure according to claim 1, wherein the casing or the cover on which the seal is disposed has an identifier used to indicate a starting point at which the cover is removed from the casing.

7. The casing structure according to claim 1, wherein the casing or the cover on which the seal is disposed has an identifier used to indicate a starting point at which the seal is removed from the casing or the cover.

8. The casing structure according to claim 1, wherein the seal is continuously and integrally molded when viewed from one side of the cover, and is continuously and integrally molded when viewed another side of the cover.

9. A casing structure, comprising:

a casing having an opening;

a cover that covers the opening of the casing, the cover openable and closable with respect to the casing; and a seal disposed between the casing and the cover, the seal contacting the casing and the cover when the cover is closed, wherein:

the casing or the cover includes at least one portion contained in the seal in a cross section taken in a direction the cover is opened or closed, and the seal is continuously and integrally molded when viewed from one side of the cover, and is discontinuously molded when viewed another side of the cover.

10. An optical scanner, comprising:

the casing structure of claim 1, and a scanning structure.

11. An image forming apparatus, comprising:

the casing structure of claim 1, and a printing structure.

\* \* \* \* \*